US012215546B2

(12) United States Patent
Pham et al.

(10) Patent No.: US 12,215,546 B2
(45) Date of Patent: Feb. 4, 2025

(54) EXTERNAL MOTOR DRIVE SYSTEM ADJUSTING FOR CREEP IN WINDOW COVERING SYSTEM WITH CONTINUOUS CORD LOOP

(71) Applicant: RYSE INC., Toronto (CA)

(72) Inventors: Trung Pham, Brampton (CA); Marc Bishara, Toronto (CA)

(73) Assignee: RYSE INC., Toronto (CA)

( * ) Notice: Subject to any disclaimer, the term of this patent is extended or adjusted under 35 U.S.C. 154(b) by 0 days.

(21) Appl. No.: 18/389,200

(22) Filed: Nov. 13, 2023

(65) Prior Publication Data

US 2024/0076936 A1 Mar. 7, 2024

Related U.S. Application Data

(62) Division of application No. 17/318,791, filed on May 12, 2021, now Pat. No. 11,840,886.

(51) Int. Cl.
*E06B 9/74* (2006.01)
*E06B 9/68* (2006.01)

(52) U.S. Cl.
CPC ........ *E06B 9/74* (2013.01); *E06B 2009/6827* (2013.01); *E06B 2009/6836* (2013.01)

(58) Field of Classification Search
CPC ............... E06B 9/74; E06B 2009/6827; E06B 2009/6836; E06B 2009/6845; E06B 2009/6909; E06B 2009/6818
See application file for complete search history.

(56) References Cited

U.S. PATENT DOCUMENTS 2,788,481 A 4/1957 Lui et al.
2,798,194 A 7/1957 Cantin
(Continued)

FOREIGN PATENT DOCUMENTS

CA 398637 A 8/1941
CA 926345 A 5/1973
(Continued)

OTHER PUBLICATIONS

Second Office Action dated Jun. 1, 2024 on CN App. 202210375711.1 (12 pages incl. translation).
(Continued)

*Primary Examiner* — Beth A Stephan
(74) *Attorney, Agent, or Firm* — Foley & Lardner LLP

(57) ABSTRACT

A drive system for raising and lowering a window covering includes a motor, a driven wheel configured to engage a continuous cord loop, a controller for the motor, a sensor, and a housing. The continuous cord loop includes an endless loop of flexible material and one or more sensor targets disposed on the endless loop of flexible material. The housing supports a guide rail adjacent the driven wheel. The sensor is mounted to the guide rail and is configured to generate a signal indicating presence of each sensor target when the target is located in proximity to or in contact with the sensor. The controller is calibrated to store an initial position of each sensor target along the continuous cord loop, and is configured to receive the signal indicating presence of the sensor target and to identify a drift from the initial position during continuing operation of the drive system.

20 Claims, 29 Drawing Sheets

(56) References Cited

U.S. PATENT DOCUMENTS

| | | | |
|---|---|---|---|
| 3,096,078 | A | 7/1963 | Steingass et al. |
| 3,117,767 | A | 1/1964 | McLean et al. |
| 3,269,454 | A | 8/1966 | Gill et al. |
| 3,561,520 | A | 2/1971 | Gill |
| 3,658,230 | A | 4/1972 | Enock |
| 4,031,944 | A | 6/1977 | Morrison et al. |
| 4,131,831 | A | 12/1978 | Bochenek et al. |
| 4,610,294 | A | 9/1986 | Anesi et al. |
| 4,618,804 | A | 10/1986 | Iwasaki |
| 4,775,039 | A | 10/1988 | Sunakawa |
| 4,819,708 | A | 4/1989 | Onosato et al. |
| 4,856,574 | A | 8/1989 | Minami et al. |
| 4,896,713 | A | 1/1990 | Rademacher |
| 4,902,953 | A | 2/1990 | Kraft et al. |
| 4,914,360 | A | 4/1990 | Hsieh et al. |
| 4,956,588 | A | 9/1990 | Ming |
| 4,958,112 | A | 9/1990 | Zerillo |
| 5,033,527 | A | 7/1991 | Ouvrard et al. |
| 5,170,108 | A | 12/1992 | Peterson et al. |
| 5,270,629 | A | 12/1993 | Hsieh |
| 5,362,222 | A | 11/1994 | Faig et al. |
| 5,414,334 | A | 5/1995 | Cheron |
| 5,465,980 | A | 11/1995 | Maurin |
| 5,532,560 | A | 7/1996 | Element et al. |
| 5,540,269 | A | 7/1996 | Plumer |
| 5,547,008 | A | 8/1996 | Sullivan |
| 5,793,174 | A | 8/1998 | Kovach et al. |
| 5,847,525 | A | 12/1998 | Cheron et al. |
| 5,959,430 | A | 9/1999 | Yuki et al. |
| 6,076,592 | A | 6/2000 | Grutzner |
| 6,148,893 | A | 11/2000 | Cadorette |
| 6,283,190 | B1 | 9/2001 | Hu et al. |
| 6,446,693 | B1 | 9/2002 | Anderson et al. |
| 6,465,980 | B1 | 10/2002 | Orsat |
| 6,516,858 | B1 | 2/2003 | Anderson et al. |
| 6,598,652 | B1 | 7/2003 | Montesinos Alonso |
| 6,827,121 | B2 | 12/2004 | Park |
| 6,850,017 | B1 | 2/2005 | Domel et al. |
| 6,935,403 | B2 | 8/2005 | Killo et al. |
| 7,337,825 | B1 | 3/2008 | Erbe |
| 7,360,576 | B2 | 4/2008 | Lin |
| 7,389,806 | B2 | 6/2008 | Kates |
| 7,466,090 | B2 | 12/2008 | Meewis et al. |
| 7,599,612 | B2 | 10/2009 | Moseley et al. |
| 7,919,939 | B2 | 4/2011 | Mosbrucker |
| 8,033,374 | B2 | 10/2011 | Gunton |
| 8,044,626 | B2 | 10/2011 | Adamus et al. |
| 8,368,328 | B2 | 2/2013 | Mullet et al. |
| 8,498,747 | B2 | 7/2013 | Feldstein |
| 8,587,242 | B2 | 11/2013 | Berman et al. |
| 8,939,190 | B2 | 1/2015 | Mullet et al. |
| 9,072,398 | B2 | 7/2015 | Choo et al. |
| 9,080,382 | B2 | 7/2015 | Lagarde et al. |
| 9,161,649 | B2 * | 10/2015 | Rastegar ................. E06B 9/322 |
| 9,534,442 | B2 | 1/2017 | Derk et al. |
| 9,609,114 | B2 | 3/2017 | Mullet et al. |
| 9,657,516 | B2 * | 5/2017 | Graybar ................ F16H 57/082 |
| 9,670,723 | B2 | 6/2017 | Pham et al. |
| 9,879,475 | B2 | 1/2018 | Mullet et al. |
| 10,104,997 | B2 | 10/2018 | Pham et al. |
| 10,494,863 | B2 | 12/2019 | Pham et al. |
| 10,626,668 | B2 | 4/2020 | Hall et al. |
| 11,178,992 | B2 | 11/2021 | Pham et al. |
| 11,840,886 | B2 * | 12/2023 | Pham ........................ E06B 9/70 |
| 2001/0050538 | A1 | 12/2001 | Kovach et al. |
| 2003/0168185 | A1 | 9/2003 | Wen et al. |
| 2003/0168187 | A1 | 9/2003 | Wen et al. |
| 2004/0026049 | A1 | 2/2004 | Park |
| 2006/0162877 | A1 | 7/2006 | Chou |
| 2007/0056697 | A1 | 3/2007 | Chen |
| 2008/0236763 | A1 | 10/2008 | Kates |
| 2008/0258644 | A1 | 10/2008 | Altonen et al. |
| 2009/0251831 | A1 | 10/2009 | Shiba et al. |
| 2010/0087958 | A1 | 4/2010 | Mullet et al. |
| 2012/0053731 | A1 | 3/2012 | Feldstein et al. |
| 2012/0090797 | A1 | 4/2012 | Mullet et al. |
| 2012/0160630 | A1 | 6/2012 | Cannaverde |
| 2012/0193035 | A1 | 8/2012 | Malekpour |
| 2012/0261078 | A1 | 10/2012 | Adams et al. |
| 2012/0261079 | A1 | 10/2012 | Chambers et al. |
| 2013/0135333 | A1 | 5/2013 | Chen et al. |
| 2013/0146436 | A1 | 6/2013 | Ticoalu et al. |
| 2013/0180676 | A1 | 7/2013 | Berman et al. |
| 2014/0008028 | A1 | 1/2014 | Rastegar |
| 2014/0138033 | A1 | 5/2014 | Lagarde et al. |
| 2014/0224437 | A1 | 8/2014 | Colson et al. |
| 2014/0359976 | A1 | 12/2014 | Lu et al. |
| 2015/0074584 | A1 | 3/2015 | Sasaki et al. |
| 2015/0288316 | A1 | 10/2015 | Hall et al. |
| 2015/0330144 | A1 | 11/2015 | Jung et al. |
| 2015/0349402 | A1 | 12/2015 | Camden et al. |
| 2015/0376943 | A1 | 12/2015 | Slupik et al. |
| 2016/0032647 | A1 | 2/2016 | Adreon et al. |
| 2016/0127530 | A1 | 5/2016 | Mullet et al. |
| 2016/0130874 | A1 | 5/2016 | Pham et al. |
| 2017/0095103 | A1 | 4/2017 | Pham et al. |
| 2017/0257927 | A1 | 9/2017 | Camden et al. |
| 2017/0260806 | A1 | 9/2017 | Adams et al. |
| 2018/0106105 | A1 | 4/2018 | Anthony et al. |
| 2018/0202224 | A1 | 7/2018 | Kumar |
| 2019/0150651 | A1 * | 5/2019 | Pham ........................ H02P 1/16 |
| 2020/0080371 | A1 | 3/2020 | Pham et al. |

FOREIGN PATENT DOCUMENTS

| | | | |
|---|---|---|---|
| CA | 1283471 | C | 4/1991 |
| CA | 2162443 | A1 | 5/1996 |
| CA | 2385368 | A1 | 9/2003 |
| CA | 2532092 | A1 | 7/2007 |
| CA | 2804238 | A1 | 1/2012 |
| CA | 2766358 | A1 | 7/2012 |
| CA | 2870983 | | 5/2016 |
| CA | 2966999 | | 5/2016 |
| CN | 2279130 | Y | 4/1998 |
| CN | 2330773 | Y | 7/1999 |
| CN | 2390001 | Y | 8/2000 |
| CN | 201332933 | Y | 10/2009 |
| CN | 203220229 | U | 10/2013 |
| CN | 203271549 | U | 11/2013 |
| CN | 107615187 | A | 1/2018 |
| CN | 108463605 | A | 8/2018 |
| DE | 89 03 355 | U1 | 6/1989 |
| DE | 19837267 | A1 | 2/2000 |
| EP | 1 700 996 | A2 | 9/2006 |
| EP | 2 682 560 | A2 | 1/2014 |
| EP | 2 743 442 | A1 | 6/2014 |
| EP | 3 215 702 | A1 | 9/2017 |
| GB | 0 236 275 | A | 7/1925 |
| GB | 2 362 675 | A | 11/2001 |
| GB | 2 362 675 | B | 12/2003 |
| WO | WO-2014/165367 | A1 | 10/2014 |
| WO | WO-2016/070279 | | 5/2016 |
| WO | WO-2017/054083 | A1 | 4/2017 |
| WO | WO-2018/037118 | A1 | 3/2018 |

OTHER PUBLICATIONS

"Axis Gear—Calibration Demo"—Video published on May 31, 2016, with video playback webpage of YouTube, LLC, at https://www.youtube.com/watch?v=GYgtDjH1t_w.

"Axis Gear—Installation Demo"—Video published on May 3, 2016, with video playback webpage of YouTube, LLC, at https://www.youtube.com/watch?v--Huzzb1mAB9l.

"Axis Gear—Motorize Your Window Shades & Curtains"—Video published on Nov. 7, 2015,with video playback webpage of YouTube, LLC, https:/www.youtube.com/watch?v=5PgSFI94pDE.

"Axis Gear—The Timeless Art of Seduction"—Video published on Nov. 9, 2015, with video playback webpage of YouTube, LLC, at http://www.youtube.com/watch?v==zgZBNhEQaYM.

"Axis Gear raising window shades"—Video published on Dec. 29, 2015, with video playback webpage of YouTube, LLC, at https://www.youtube.com/watch?v=LUB0xSB2Evw.

(56) References Cited

OTHER PUBLICATIONS

"Axis Gear—Motorize your window shades"—Video published on Jun. 28, 2016, with video playback web page of YouTube, LLC, at https://www.youtube.com/watch?v==E12YGTvcbCw. iw1~?,v.,cmtuhe.corniwatcl(\=E12Y GTvchCw.
"CEDIA 2016: Axis Launches Axis Gear at CEDIA 2016"—Video published on Sep. 15, 2016, with video playback webpage of YouTube, LLC, at https://www.youtube.com/watch?v ==9PLOkA1tfvc.
"Controlling the Axis Gear"—Video published on Oct. 27, 2015, with video playback webpage of YouTube, LLC, at https://www.youtube.com/watch?y=e2 WSkKYx~zM.
"Installing Axis Gear"—Video published on Oct. 27, 2015, with video playback webpage of YouTube, LLC, at https://www. youtube.com/watch?v==u61BD16e720.
"Lifestyle Video Axis Gear 2MIN"—Video published on Apr. 7, 2016, with video playback webpage of YouTube, LLC, at https://www.youtube.com/watch?v==NvJxe3tzrPc.
"Motorize your window shades with Axis Gear"—Video published on Oct. 26, 2015, with video playback webpage of YouTube, LLC, at https://www.youtube.com/watch?v==dJgA8LcjnnU.
"Wake Up To Sunshine with Axis Gear"—Video published on Nov. 3, 2015, with video playback webpage of YouTube, LLC, at https://www.youtube.com/watch?v=RE2hMiJdvnQ.
"Driven Pulley", ScienceDirect Topics, retrieved Feb. 12, 2021 from URL: https://www.sciencedirect.com/topics/engineering/driven-pulley, 2021 (37 pages).
Bortnowski et al., "Tests of Belt Linear Speed for Identification of Frictional Contact Phenomena", Sensors, vol. 20, 2020 (13 pages).
Canadian Office Action issued in CA Appl. Ser. No. 2,966,999, dated Feb. 20, 2019 (5 pages).
Chinese Decision of Rejection issued in CN Appl. Ser. No. 201580065177.2, dated Apr. 24, 2020 (7 pages).
Chinese Office Action issued in CN Appl. Ser. No. 2015/80065177.2, dated Aug. 24, 2018 (12 pages).
Chinese Office Action issued in CN Appl. Ser. No. 2015/80065177.2, dated Jun. 5, 2019 (9 pages).
Chinese Office Action issued in CN Appl. Ser. No. 2015/80065177.2, dated Sep. 10, 2019 (16 pages).
Chinese Office Action issued in CN Appl. Ser. No. 2016800706680, dated Mar. 7, 2019 (10 pages).
Chinese Office Action issued in CN Appl. Ser. No. 201911099117.9 dated Apr. 2, 2021 (11 pages).
European Patent Office Search Report on EP Application 19911107.1 dated Feb. 21, 2023 (18 pages).
Examination Report for CA 3066140 dated Nov. 16, 2021 (3 pages).
Extended European Search Report dated Jul. 2, 2019, issued in corresponding European Application No. 16849985.3, 8 pages.
Extended European Search Report, dated Aug. 13, 2018, issued in corresponding European Patent Application No. EP 15 85 6630, 10 pages.
Final Office Action on U.S. Appl. No. 17/318,791 dated Apr. 20, 2023 (7 pages).
Foreign Action other than Search Report on CA 3066140 dated Apr. 29, 2022 (3 pages).
Foreign Search Report on EPO Application 22201695.8 dated Jan. 24, 2023 (14 pages).
Hwangbo et al., "Cable-Driven Actuation for Highly Dynamic Robotic Systems", IEEE/RSJ International Conference on Intelligent Robots and Systems (IROS), Jun. 27, 2018, arXiv:1806.10632v1 (9 pages).
International Preliminary Report on Patentability, Ch. I, for PCT/CA2019/050715 dated Aug. 5, 2021 (7 pages).
International Search Report and the Written Opinion of the International Searching Authority mailed Sep. 17, 2019 in corresponding International Application No. PCT/CA2019/050715, 12 pages.
International Search Report and Written Opinion in PCT Appl. Ser. No. PCT/CA2015/051140, dated Jan. 11, 2016 (8 pages).
International Search Report and Written Opinion on PCT Appl. Ser. No. PCT/CA2022/050285 dated May 16, 2022 (11 pages).
International Search Report issued in PCT Appl. Ser. No. PCT/CA2016/051138, date of mailing of International Search Report Jan. 17, 2017 (6 pages).
Jin et al., "Geometric Parameter Calibration for a Cable-Driven Parallel Robot Based on a Single One-Dimensional Laser Distance Sensor Measurement and Experimental Modeling", Sensors, vol. 18, No. 7, Jul. 2018, pp. 2392 (27 pages).
Karanth et al., "An Experimental Technique to Measure Creep in Conveyor Belt Drives", Bulk Solids Handling, vol. 14, Nov. 4, 1994, retrieved Feb. 12, 2021 from URL: https://www.ckit.co.za/secure/conveyor/papers/bulk-solids-handling/experimentaltech1.htm (7 pages).
Lutron Intelligent Hembar AlignmentTM; Technical White Paper; May 2010; 8 pages.
Notice of Allowance on U.S. Appl. No. 16/681,037 dated Jun. 6, 2022 (8 pages).
Notice of Allowance on U.S. Appl. No. 17/318,791 dated Aug. 3, 2023 (7 pages).
Notification of Reexamination for CN 201580065177.2 dated Sep. 13, 2021 (9 pages).
Piao et al., "Open-loop position control of a polymer cable-driven parallel robot via a viscoelastic cable model for high payload workspaces", Advances in Mechanical Engineering, vol. 9, No. 12, 2017, DOI: 10.1177/1687814017737199 (12 pages).
Reexamination Decision for CN 201580065177.2 dated Jan. 29, 2022 (40 pages).
Second Examiner's Report on CA App. 3,000,108 dated Mar. 20, 2023 (4 pages).
Second Office Action for CN 201911099117.9 dated Aug. 31, 2021 (7 pages).
Second Office Action on CN App. 201980092944.7 dated May 23, 2023 (14 pages).
U.S. Non-Final Office Action on U.S. Appl. No. 17/318,791 dated Dec. 6, 2022 (11 pages).

* cited by examiner

EXTERNAL MOTOR DRIVE SYSTEM ADJUSTING FOR CREEP IN WINDOW COVERING SYSTEM WITH CONTINUOUS CORD LOOP

CROSS-REFERENCE TO RELATED APPLICATIONS

The present application is a divisional of U.S. Ser. No. 17/318,791, entitled "EXTERNAL MOTOR DRIVE SYSTEM ADJUSTING FOR CREEP IN WINDOW COVERING SYSTEM WITH CONTINUOUS CORD LOOP," filed May 12, 2021, the entire contents of which are hereby incorporated by reference.

TECHNICAL FIELD

The present disclosure relates to a system for spreading and retracting window coverings that use continuous cord loops, and more particularly to an external motor drive device for a system for spreading and retracting window coverings.

BACKGROUND

Window covering systems for spreading and retracting coverings for architectural openings such as windows, archways and the like are commonplace. Systems for spreading and retracting such window coverings may operate for example by raising and lowering the coverings, or by laterally opening and closing the coverings. The terms spreading and retracting, opening and closing, and raising and lowering window coverings are all used herein depending on context. Such window covering systems typically include a headrail or cassette, in which the working components for the covering are primarily confined. In some versions, the window covering system includes a bottom rail extending parallel to the headrail, and some form of shade material which might be fabric or shade or blind material, interconnecting the headrail and bottom rail. The shade or blind material is movable with the bottom rail between spread and retracted positions relative to the headrail. For example, as the bottom rail is lowered or raised relative to the headrail, the fabric or other material is spread away from the headrail or retracted toward the headrail so it can be accumulated either adjacent to or within the headrail. Such mechanisms can include various control devices, such as pull cords that hang from one or both ends of the headrail. The pull cord may hang linearly, or in the type of window covering systems addressed by the present invention, the pull cord may assume the form of a closed loop of flexible material such as a rope, cord, or beaded chain, herein referred to as a continuous cord loop, or alternatively as chain/cord.

In some instances, window covering systems have incorporated a motor that actuates the mechanism for spreading and retracting the blind or shade material, and controlling electronics. Most commonly, the motor and controlling electronics has been mounted within the headrail of the window blinds, or inside the tubes (sometimes called tubular motors), avoiding the need for pull cords such as a continuous cord loop. Using such motor-operated systems or devices, the shade or blind material can be spread or retracted by user actuation or by automated operation, e.g., triggered by a switch or photocell. Such window covering systems in which the motor and controlling electronics has been mounted within the headrail are sometimes herein called an "internal motor," "internal motor device," or "internal motor system."

The drive system of the present invention incorporates a motor and controlling electronics mounted externally to the mechanism for spreading and retracting the blind or shade material. Such drive system is herein called an "external motor," "external motor device," or "external motor system," and alternatively is sometimes called an "external actuator." External motor systems are typically mounted externally on the window frame or wall and engage the cords or chains (continuous cord loop) of window coverings in order to automate opening and closing the blind.

In both internal motor systems and external motor systems (herein sometimes called collectively, motorized systems), automated drive systems incorporate controlling electronics to control operation. Commonly, motorized systems have been controlled through user control mechanisms that incorporate a radio frequency ("RF") controller or other remote controller for wireless communication with a drive system associated with the motor. Such remote user control systems have taken various forms such as a handheld remote control device, a wall-mounted controller/switch, a smart-home hub, a building automation system, and a smart phone, among others. The use of such remote control devices is particularly germane to internal motor systems in which it is difficult or impossible to integrate user control devices within the internally mounted drive system.

In the external motor drive system of the present disclosure, since the external actuator is separated from the headrail or other window coverings mechanism, this opens up new possibilities for integrating user controls in the external actuator itself. These integrated control features are herein sometimes called "on-device controls." On-device control of external motor systems offers various advantages, such as simplicity of operation, and convenience in accessing the control device and in executing control functions. Such on-device control of external motor systems can be integrated with automated control systems through appropriate sensors, distributed intelligence, and network communications.

Automated control over window covering systems can provide various useful control functions. Examples of such automated window control functions include calibrating the opening and closing of blinds to meet the preferences of users, and controlling multiple blinds in a coordinated or centralized fashion. There effectively is a need to integrate various automated window control functions in on-device control for external actuators.

In cord-type continuous cord loop motor drive systems, the window covering drive mechanism is a cord that engages a pulley drive of the motor drive system. The cord, such as cords formed from synthetic and natural fibers, can undergo various physical effects relative to the pulley drive during continuing operation. There is a need to maintain accuracy of automated control of window covering functions while compensating for any physical effects of a continuous cord loop cord/pulley motor drive system.

SUMMARY

The embodiments described herein include a motor drive system for operating a mechanism for spreading and retracting window coverings. The motor drive system includes a motor operating under electrical power and a drive assembly. The motor drive system advances a continuous cord loop in response to positional commands from a controller.

In a continuous cord loop/motor drive system, there is a need to maintain accuracy of automated positioning control of a window covering while compensating for physical effects during continuing operation. Embodiments described herein incorporate a continuous cord loop sensor system to maintain accuracy of automated positioning control of window coverings, e.g., in the event of material fatigue or creep of the continuous cord loop or in the event of stretching of the continuous cord loop.

In various embodiments, the continuous cord loop comprises a cord-type continuous cord loop, also herein called a continuous cord loop cord, and the motor drive system comprises a pulley motor drive system. In conventional practice, the primary concern is that cord/pulley motor drive system are vulnerable to slipping during continuing operation. However, frictional engagement of the cord by the pulley drive can withstand forces applied during normal operation without slipping, and the primary cause of positioning error is material fatigue or "creep" of the continuous cord loop cord. Embodiments described herein incorporate a continuous cord loop sensor system to maintain accuracy of automated positioning control of window coverings in the event of material fatigue or creep of the continuous cord loop cord.

In various embodiments, the continuous cord loop comprises a chain-type continuous cord loop, also herein called a continuous cord loop chain, and the motor drive system comprises a sprocket wheel motor drive system. Embodiments described herein incorporate a continuous cord loop sensor system to maintain accuracy of automated positioning control of window coverings in the event of stretching of the continuous cord loop chain.

In various embodiments, a drive system is configured for use with a window covering system including a mechanism for extending and retracting a window covering and a continuous cord loop extending below the mechanism. The drive system includes a motor configured to operate under electrical power to rotate an output shaft of the motor, and a driven wheel coupled to the output shaft of the motor and configured to engage the continuous cord loop. Rotation of the driven wheel in a first direction advances the continuous cord loop to cause the mechanism to extend the window covering and rotation of the driven wheel in second direction advances the continuous cord loop to cause the roller blind mechanism to retract the window covering fabric. The continuous cord loop comprises an endless loop of flexible material and one or more sensor target disposed on the endless loop of flexible material. A sensor target is also herein referred to as a marker or a target.

Additional components of the drive system include a controller for the motor, a sensor operatively connected to the controller, and a housing for the motor, the driven wheel, and the controller. The housing includes a guide rail adjacent the driven wheel, wherein the sensor is mounted to the guide rail and is configured to generate a signal indicating presence of the sensor target (or one of multiple sensor targets) when the sensor target is located in proximity to or in contact with the sensor. In an embodiment, the controller is calibrated to store an initial position of a sensor target (single marker) along the continuous cord loop. In an embodiment, the controller is calibrated to store an initial top position of a first marker at a top position along the continuous cord loop, and is calibrated to store an initial position of a second marker at a bottom position along the continuous cord loop. The controller is configured to receive the signal indicating presence of a sensor target and to identify a drift (e.g., shift or change in values) from the initial position (or respective initial position) during continuing operation of the drive system.

In an embodiment, a drive system is configured for use with a window covering system, the window covering system including a mechanism for extending and retracting a window covering and a continuous cord loop extending below the mechanism. The drive system includes a motor configured to operate under electrical power to rotate an output shaft of the motor, a driven wheel coupled to the output shaft of the motor and configured to engage the continuous cord loop, and a controller for the motor. The drive system includes a housing containing the motor, the driven wheel, and the controller. The drive system further includes a rechargeable battery electrically coupled to the motor and to the controller. The motor and the controller are battery-powered and the rechargeable battery is contained within the housing or joined to the housing.

In an embodiment, an input-output ("I/O") device for the controller includes an input interface that receives user inputs along an input axis, and a visual display aligned with the input axis of the input interface. In an embodiment, the I/O device includes a capacitive touch strip that receives user inputs along an input axis, and an LED strip aligned with the input axis. In an embodiment, the I/O device extends vertically on the exterior of a housing for the motor drive system, and the housing supports input buttons. In an embodiment, buttons on the housing include a group mode module and a set control module. In another embodiment, the housing supports an RF communication button.

In an embodiment, a group mode module communicates the positional commands to other motor drive systems within an identified group to operate respective of other mechanisms of the other motor drive systems. In an embodiment, the group mode module causes an RF communication module to communicate the positional commands to other motor drive systems. In an embodiment, the other motor drive systems within the identified group operate the respective other mechanisms in accordance with a calibration of a respective top position and a respective bottom position for each of the other motor drive systems.

In an embodiment, a set control module enables user calibration of a top position and a bottom position of travel of the window covering. In an embodiment, during calibration the user moves the window covering respectively to the top position and the bottom position with the input interface, and presses a set button to set these positions.

In an embodiment, the drive assembly comprises a driven wheel configured for engaging and advancing the continuous cord loop coupled to the mechanism for raising and lowering the window covering, and an electrically powered coupling mechanism coupling the driven wheel to the output shaft of the motor and configured for rotating the driven wheel in first and second senses. Rotation of the driven wheel in a first sense advances the continuous cord loop in the first direction, and rotation of the driven wheel in a second sense advances the continuous cord loop in the second direction. The controller provides the positional commands to the motor and the electrically powered coupling mechanism to control the rotation of the driven wheel in the first and second senses.

In an embodiment, in addition to providing positional commands to the motor and the drive assembly, and other control commands, via external motor device on-device controls, such commands may be provided by I/O devices separate from the external motor device on-device control, such as mobile user devices. In an embodiment, the control system includes a web application that can emulate various one-axis input and one-axis display features of external motor on-device controls.

In an embodiment, the external motor device is configured to raise or lower the window covering, such as in roller shades and Roman shades, via vertical position control. In an embodiment, the external motor device is configured to open or close the window covering laterally (e.g., across the window frame), such as in vertical blinds or curtains, via horizontal position control. In an embodiment, the control system includes a graphical user interface configured to display an input control that extends either vertically or horizontally, depending on the type of window covering system that is driven by the external motor.

In an embodiment, a motor drive system comprises a motor configured to operate under electrical power to rotate an output shaft of the motor, wherein the motor is external to a mechanism for raising and lowering a window covering; and a drive assembly configured for engaging and advancing a continuous cord loop coupled to the mechanism for raising and lowering the window covering. Advancing the continuous cord loop in a first direction raises the window covering, and advancing the continuous cord loop in a second direction lowers the window covering. The motor drive system includes a controller for providing positional commands to the motor and the drive assembly to control advancing the continuous cord loop in the first direction and advancing the continuous cord loop in the second direction. An I/O device for the controller includes an input interface that receives user inputs along an input axis to cause the controller to provide the positional commands to the motor and the drive assembly, and a visual display aligned with the input axis of the input interface.

In an embodiment, a drive system for use with a window covering system including a headrail, a mechanism associated with the headrail for spreading and retracting a window covering, and a continuous cord loop extending below the headrail for actuating the mechanism for spreading and retracting the window covering, comprises a motor configured to rotate an output shaft of the motor; a drive assembly configured for engaging and advancing the continuous cord loop coupled to the mechanism for spreading and retracting the window covering, wherein advancing the continuous cord loop in a first direction spreads the window covering, and advancing the continuous cord loop in a second direction retracts the window covering; a controller for providing positional commands to the motor and the drive assembly to control the advancing the continuous cord loop in the first direction and the advancing the continuous cord loop in the second direction; and an I/O device for the controller, including an input interface that receives user inputs along an input axis to cause the controller to provide the positional commands to the motor and the drive assembly, and further including a visual display aligned with the input axis of the input interface; wherein the drive assembly and the controller operate in one of a vertical mode and a horizontal mode; wherein in the vertical mode the drive assembly is configured for advancing the continuous cord loop in the first direction to lower the window covering and is configured for advancing the continuous cord loop in the second direction to raise the window covering, and the visual display and the input axis of the input interface are aligned vertically; and wherein in the horizontal mode the drive assembly is configured for advancing the continuous cord loop in the first direction to laterally close the window covering and is configured for advancing the continuous cord loop in the second direction to laterally open the window covering, and the visual display and the input axis of the input interface are aligned horizontally.

In another embodiment, a drive system for use with a window covering system including a mechanism for spreading and retracting a window covering, and a continuous cord loop extending below the mechanism for spreading and retracting the window covering, comprises a motor configured to rotate an output shaft of the motor; a drive assembly configured for engaging and advancing the continuous cord loop coupled to the mechanism for spreading and retracting the window covering, wherein advancing the continuous cord loop in a first direction spreads the window covering, and advancing the continuous cord loop in a second direction retracts the window covering; a temperature sensor communicatively coupled to the controller for providing positional commands to the motor and the drive assembly, wherein the temperature sensor is configured to provide a temperature output representative of a temperature in the vicinity of the drive system; a light sensor communicatively coupled to the controller for providing positional commands to the motor and the drive assembly, wherein the light sensor is configured to provide a light output representative of intensity of ambient light in the vicinity of the drive system; a controller for providing positional commands to the motor and the drive assembly to control the advancing the continuous cord loop in the first direction and the advancing the continuous cord loop in the second direction; wherein the controller receives a plurality of sunlight entrance conditions including the temperature output and the light output, wherein in the event the plurality of sunlight entrance conditions received by the controller corresponds to one or more window cover criteria, the controller causes the drive assembly to advance the continuous cord loop in the first direction to spread the window covering, and in the event the plurality of sunlight entrance conditions received by the controller corresponds to one or more window uncover criteria, the controller causes the drive assembly to advance the continuous cord loop in the second direction to retract the window covering.

In another embodiment, a method for controlling a motor-driven device comprises receiving, by a processor via a graphical user interface of a computing device, a request for selecting a window covering mechanism from at least one vertical window covering mechanisms configured for raising and lowering a window covering via a motor-driven device and at least one horizontal window covering mechanisms configured for laterally opening and closing the window covering via the motor-driven device; displaying, by the processor via the graphical user interface of the computing device, a graphical representation of the at least one vertical window covering mechanisms and the at least one horizontal window covering mechanisms, and receiving a selection of one of the at least one vertical window covering mechanisms and the at least one horizontal window covering mechanisms; in response to the receiving the selection of one of the at least one vertical window covering mechanisms and the at least one horizontal window covering mechanisms, if the selected window covering mechanism is one of the at least one vertical window covering mechanisms, displaying via the graphical user interface a position control visual display with an input axis, wherein the input axis is aligned vertically; if the selected window covering mechanism is one of the at least one horizontal window covering mechanisms, displaying via the graphical user interface a position control visual display with an input axis, wherein the input axis is aligned horizontally; and in response to receiving a position control input via the position control visual display with the input axis, outputting to the motor-driven device, by the processor, a position control command based on the position control input.

In a further embodiment, a motor drive system, comprises a motor configured to operate under electrical power to rotate an output shaft of the motor, wherein the motor is external to a mechanism for raising and lowering a window covering; a drive assembly configured for engaging and advancing a continuous cord loop coupled to the mechanism for raising and lowering the window covering, wherein advancing the continuous cord loop in a first direction raises the window covering, and advancing the continuous cord loop in a second direction lowers the window covering; a controller for providing positional commands to the motor and the drive assembly to control the advancing the continuous cord loop in the first direction and the advancing the continuous cord loop in the second direction; wherein the drive assembly comprises an electrically powered coupling mechanism coupling the drive assembly to the output shaft of the motor and configured for rotating the driven wheel in first and second senses, and a motor controller for powering the electrically powered coupling mechanism; wherein the controller and motor controller are configured to execute a motor ramp trajectory speed control that limits acceleration of the motor from an idle state to full operating speed, and limits deceleration of the motor from full operating speed back to the idle state.

In an embodiment, a drive system for use with a window covering system including a headrail, a mechanism associated with the headrail for spreading and retracting a window covering, and a continuous cord loop extending below the headrail for actuating the mechanism for spreading and retracting the window covering, comprises a motor configured to rotate an output shaft of the motor; a drive assembly configured for engaging and advancing the continuous cord loop coupled to the mechanism for spreading and retracting the window covering, wherein advancing the continuous cord loop in a first direction spreads the window covering, and advancing the continuous cord loop in a second direction retracts the window covering; a controller configured to provide positional commands to the motor and the drive assembly to control the advancing the continuous cord loop in the first direction and the advancing the continuous cord loop in the second direction; and an I/O device for the controller including a graphical user interface configured to receive user inputs to cause the controller to control the positional commands to the motor and the drive assembly at a selected speed of the advancing the continuous cord loop in a selected one of the first direction or the second direction, wherein in a first speed control mode the I/O device causes the controller to control the speed of the advancing the continuous cord loop at a selected percentage within a range of speeds from stationary to a maximum speed, and in a second speed control mode the input output device causes the controller to control the speed of the advancing the continuous cord loop at a selected one of a limited number of predetermined speed levels.

In an embodiment, a motor drive system comprises a first motor configured to operate under electrical power to rotate an output shaft of the motor, wherein the first motor is external to a first mechanism for raising and lowering a window covering; a drive system configured for engaging and advancing a continuous cord loop coupled to the first mechanism for raising and lowering the window covering, wherein advancing the continuous cord loop in a first direction raises the window covering, and advancing the continuous cord loop in a second direction lowers the window covering; a controller for providing positional commands to the first motor and the first electrically powered drive system to control the advancing of the continuous cord loop in the first direction and the advancing of the continuous cord loop in the second direction; an RF communication module operatively coupled to the controller for controlling RF communication of the positional commands to a network of other motor drive systems for operating respective other mechanisms for raising and lowering respective other window coverings; and a group mode module, for identifying one or more of the other motor drive systems included in a user-selected group, and for causing the RF communication module to communicate the positional commands to the identified one or more of the other motor drive.

In an embodiment, a motor drive system comprises a motor configured to operate under electrical power to rotate an output shaft of the motor, wherein the motor is external to a mechanism for raising and lowering a window covering; a drive assembly configured for engaging and advancing a continuous cord loop coupled to the mechanism for raising and lowering the window covering, wherein advancing the continuous cord loop in a first direction raises the window covering, and advancing the continuous cord loop in a second direction lowers the window covering; a controller for providing positional commands to the motor and the drive assembly to control the advancing of the continuous cord loop in the first direction and the advancing of the continuous cord loop in the second direction to control the raising and lowering the window covering; and a set control module for user calibration of a top position and a bottom position of the window covering, wherein following the user calibration the controller limits the raising and lowering the window covering between the top position and the bottom position.

In one embodiment, a drive system for use with a window covering system, the window covering system including a mechanism for raising and lowering a window covering and a continuous cord loop extending below the mechanism; the drive system comprises a motor configured to operate under electrical power to rotate an output shaft of the motor; a driven wheel coupled to the output shaft of the motor and configured to engage the continuous cord loop, wherein rotation of the driven wheel in a first direction advances the continuous cord loop to cause the mechanism to raise the window covering and rotation of the driven wheel in second direction advances the continuous cord loop to cause the mechanism to lower the window covering; one or more sensor targets disposed on the continuous cord loop; a controller for the motor; and a sensor operatively connected to the controller and configured to generate a signal indicating presence of each of the one or more sensor targets disposed on the continuous cord loop when the sensor target is located in proximity to or in contact with the sensor.

In another embodiment, a drive system may be used with a window covering system, the window covering system including a roller blind mechanism for raising and lowering a window covering fabric and a continuous cord loop extending below the mechanism; the drive system comprises: a motor configured to operate under electrical power to rotate an output shaft of the motor; a driven wheel coupled to the output shaft of the motor and configured to engage the continuous cord loop; one or more sensor targets disposed on the continuous cord loop; a controller for the motor; and a sensor operatively connected to the controller and is configured to generate a signal indicating presence of the sensor target on the continuous cord loop when the sensor target is located in proximity to or in contact with the sensor, wherein the controller is calibrated to store a position of each of the one or more sensor targets along the continuous cord loop and is configured to receive the signal indicating presence of each sensor target and to identify a drift from the respective position during continuing operation of the drive system.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

DETAILED DESCRIPTION

Figure 1:
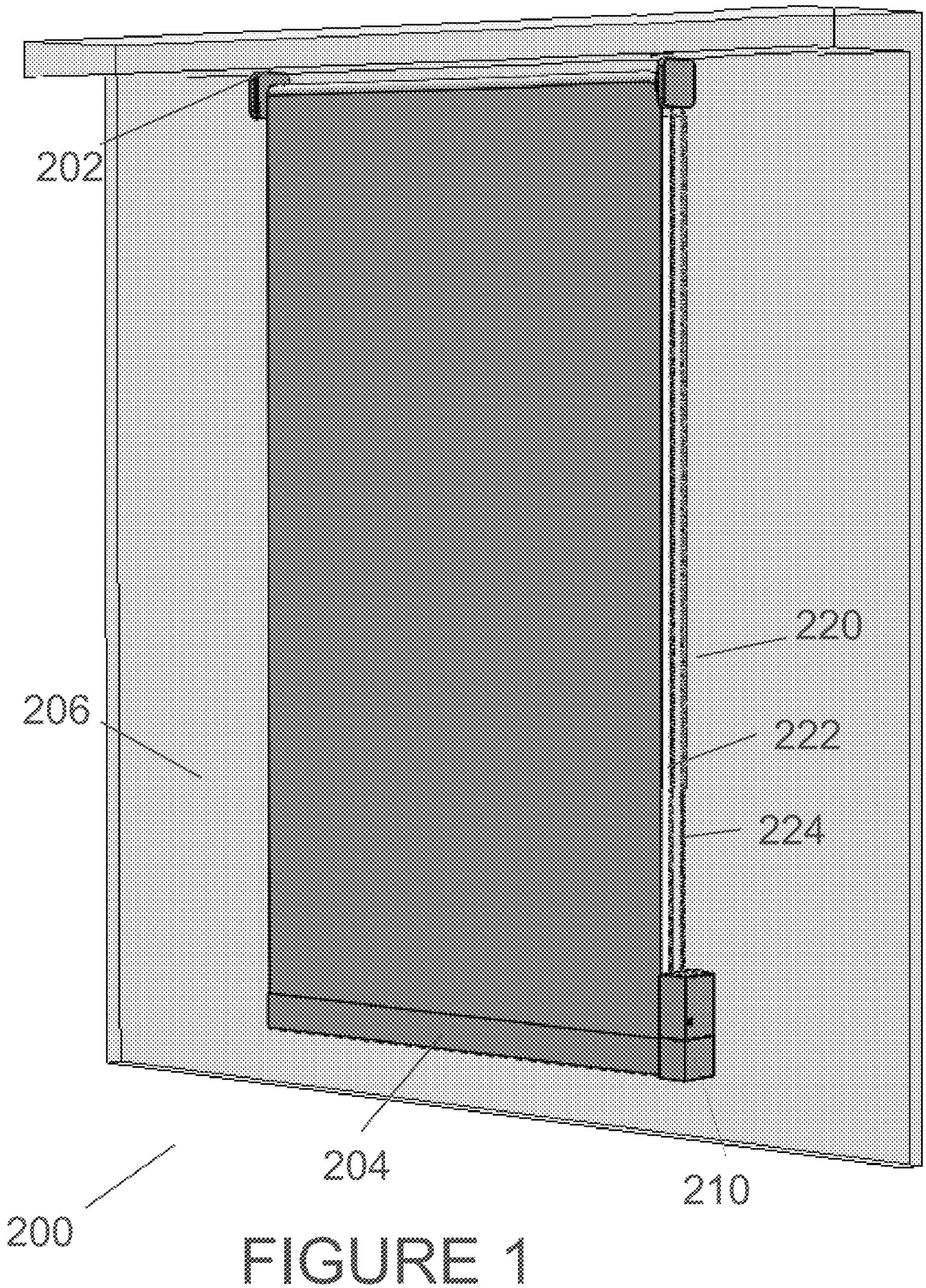
FIG. 1 is a perspective view of a window covering system with an external motor system installed on a flat wall, according to an embodiment.

The present disclosure is herein described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here. Furthermore, the various components and embodiments described herein may be combined to form additional embodiments not expressly described, without departing from the spirit or scope of the invention.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one, skilled in the relevant art and having possession of this disclosure, are to be considered within the scope of the invention.

The present disclosure describes various embodiments of an external motor device for controlling the operation of a window covering system. In various embodiments, the external motor device employs on-device control, employs a separate control device (e.g., a mobile computing device), or both. As used in the present disclosure, a "window covering system" is a system for spreading and retracting or raising and lowering a window covering. In an embodiment as shown at 200 in FIG. 1, the window covering system includes a headrail 202, and a mechanism (not shown) associated with the headrail (i.e., a mechanism within the headrail or adjacent the headrail) for spreading and retracting a window covering. In this embodiment, the window covering system 200 includes a continuous cord loop 220 extending below the headrail for actuating the mechanism associated with the headrail, to spread and retract the window covering. As used in the present disclosure, "headrail" is a broad term for a structure of a window covering system including a mechanism for spreading and retracting the window covering. The window covering system further includes an external motor 210. Continuous cord loop 220 operatively couples the window covering mechanism associated with headrail 202 to the external motor 210 to raise and lower a window shade (fabric, or blind) 204. As seen in FIG. 2, external motor 210 is mounted to the wall 206 adjacent to the window, which is covered by shade 204 in this view. For example, external actuator may be mounted to wall 206 using hardware such as bolts 214, or using a mounting fixture such as bracket 194 in FIG. 4.

In the present disclosure, "window covering" includes any covering material that may be spread and retracted to cover a window or other architectural opening using a continuous cord loop system (i.e., system with a mechanism for spreading and retracting the window covering using a continuous cord loop). Such window coverings include most shades and blinds as well as other covering materials, such as roller shades; honeycomb shades; horizontal sheer shades, pleated shades, woven wood shades, Roman shades, Venetian blinds, Pirouette® shades (Pirouette is a trademark of Hunter Douglas N.V., Rotterdam, Germany), and certain systems for opening and closing curtains and drapery. Window covering embodiments described herein refer to blind or blinds, it being understood that these embodiments are illustrative of other forms of window coverings.

As used in the present disclosure, a "continuous cord loop" is an endless loop of flexible material, such as fiber cord, beaded chain and ball chain. As used in the present disclosure, fiber cord continuous cord loops are sometimes referred to as cord-type continuous cord loops, continuous cord loop cords, or simply cords. Chain-type continuous cord loops are sometimes referred to herein as continuous cord loop chains. Various types of metal and plastic beaded chain and ball chain are commonly used as continuous cord loops for window covering systems. A typical ball chain diameter is 5 mm (0.2 inch), and may include metal and plastic beaded chains or ball chains. A cord-type continuous cord loop includes a length of natural or synthetic fiber. Continuous cord loops in the form of loops of fiber are available in various types and ranges of diameter including for example D-30 (1⅛"-1¼"), C-30 (1³⁄₁₆"-1⁷⁄₁₆"), D-40 (1³⁄₁₆"-1⁷⁄₁₆"), and K-35 (1¼"-1½"). In various embodiments, cords are made from lengths of fiber that are braided, twisted, or plaited together forming a round composite structure. Synthetic fiber cords may be formed for example of nylon, polypropylene, or polyester. Natural fiber cords may be formed of manila or sisal, for example.

The continuous cord loop includes two substantially parallel cords or chains having a total length (e.g., 1 m) and a loop length or "drop" (e.g., 0.5 m). Continuous cord loops come in different cord loop lengths, i.e., the length between the first loop end and the second loop end, sometimes rounded off to the nearest foot. In a common window covering system design, the continuous cord loop includes a first loop end at the headrail engaging a mechanism associated with the headrail for spreading and retracting the window covering, and includes a second loop end remote from the headrail. In one embodiment, e.g., in a roller blinds system, the continuous cord loop extends between the headrail and the second loop end, but does not extend across the headrail. In this embodiment, the first loop end may wrap around a clutch that is part of the mechanism spreading and retracting the blind. In another embodiment, e.g., in a vertical blinds system, a segment of the continuous cord loop extends across the headrail. In an embodiment, the continuous cord loop extends below the headrail in a substantially vertical orientation. When retrofitting the present external motor device to control a previously installed window coverings system, the continuous cord loop may be part of the previously installed window coverings mechanism. Alternatively, the user can retrofit a continuous cord loop cord or chain to a previously installed window coverings mechanism.

The continuous cord loop system may spread and retract the window covering by raising and lowering, laterally opening and closing, or other movements that spread the window covering to cover the architectural opening and that retract the window covering to uncover the architectural opening. Embodiments described herein generally refer to raising and lowering blinds either under control of an external motor system or manually, it being understood that these embodiments are illustrative of other motions for spreading and retracting window coverings. External actuator 210 incorporates a motor drive system and controlling electronics for automated movement of the continuous cord loop 220 in one of two directions to raise or lower the blind 204. In one embodiment of window covering system 200, the continuous cord loop 220 includes a rear cord/chain 224 and a front cord/chain 222. In this embodiment, pulling down the front cord raises (retracts) the blind, and pulling down the rear cord lowers (spreads) the blind. As used in the present disclosure, to "advance" the continuous cord loop means to move the continuous cord loop in either direction (e.g., to pull down a front cord of a continuous cord loop or to pull down a back cord of a continuous cord loop). In an embodiment, the blind automatically stops and locks in position when the continuous cord loop is released. In an embodiment, when at the bottom of the blind, the rear cord of the continuous cord loop can be used to open any vanes in the blind, while the front cord can be used to close these vanes.

Figure 2:
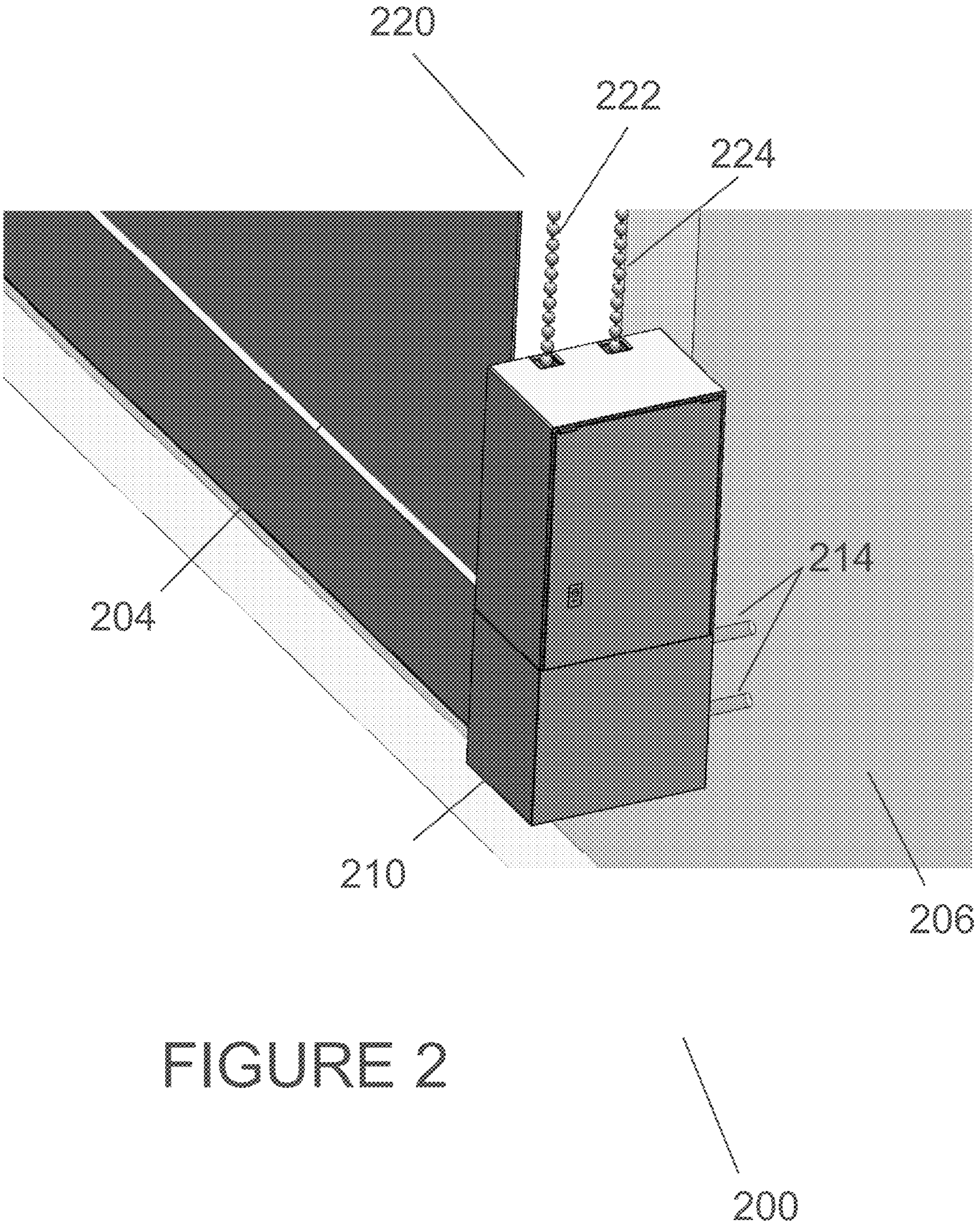
FIG. 2 is a perspective view of an installed external motor system for a window covering system, according to the embodiment of FIG. 1.
Figure 3:
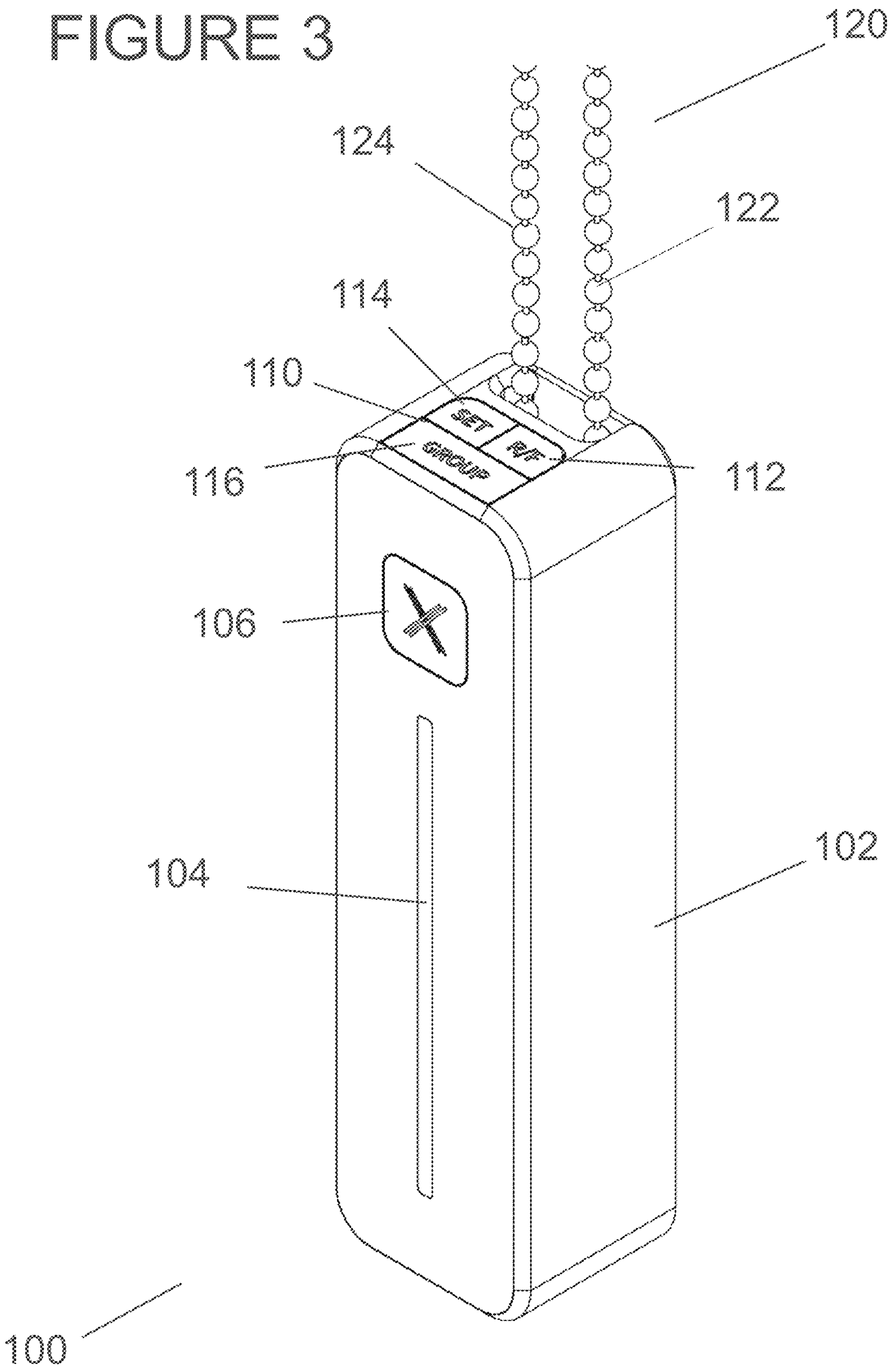
FIG. 3 is an isometric view of an external motor device.

As seen in the isometric view of FIG. 3, an external motor 100 generally corresponding to the external motor 210 of FIGS. 1 and 2 may include a housing 102 that houses a motor, associated drive mechanisms, and control electronics. External actuator 100 includes various on-device controls for user inputs and outputs. For example, external actuator 100 may include a touch strip 104 (also called slider or LED strip). In the illustrated embodiment, touch strip 104 includes a one-axis input device and a one-axis visual display. External actuator 100 further includes various button inputs including power button 106 at the front of the housing, and a set of control buttons 110 at the top of the housing. In an embodiment, control buttons 110 include an RF button 112, a Set button 114, and a Group button 116.

In an embodiment, buttons 106, 110 are physical (moveable) buttons. The buttons may be recessed within housing 102 or may project above the surface of housing 102. In lieu of or in addition to the touch strip and the physical buttons seen in FIG. 1, the input controls may include any suitable input mechanism capable of making an electrical contact closure in an electrical circuit, or breaking an electrical circuit, or changing the resistance or capacitance of an electrical circuit, or causing other state change of an electrical circuit or an electronic routine.

Figure 16:
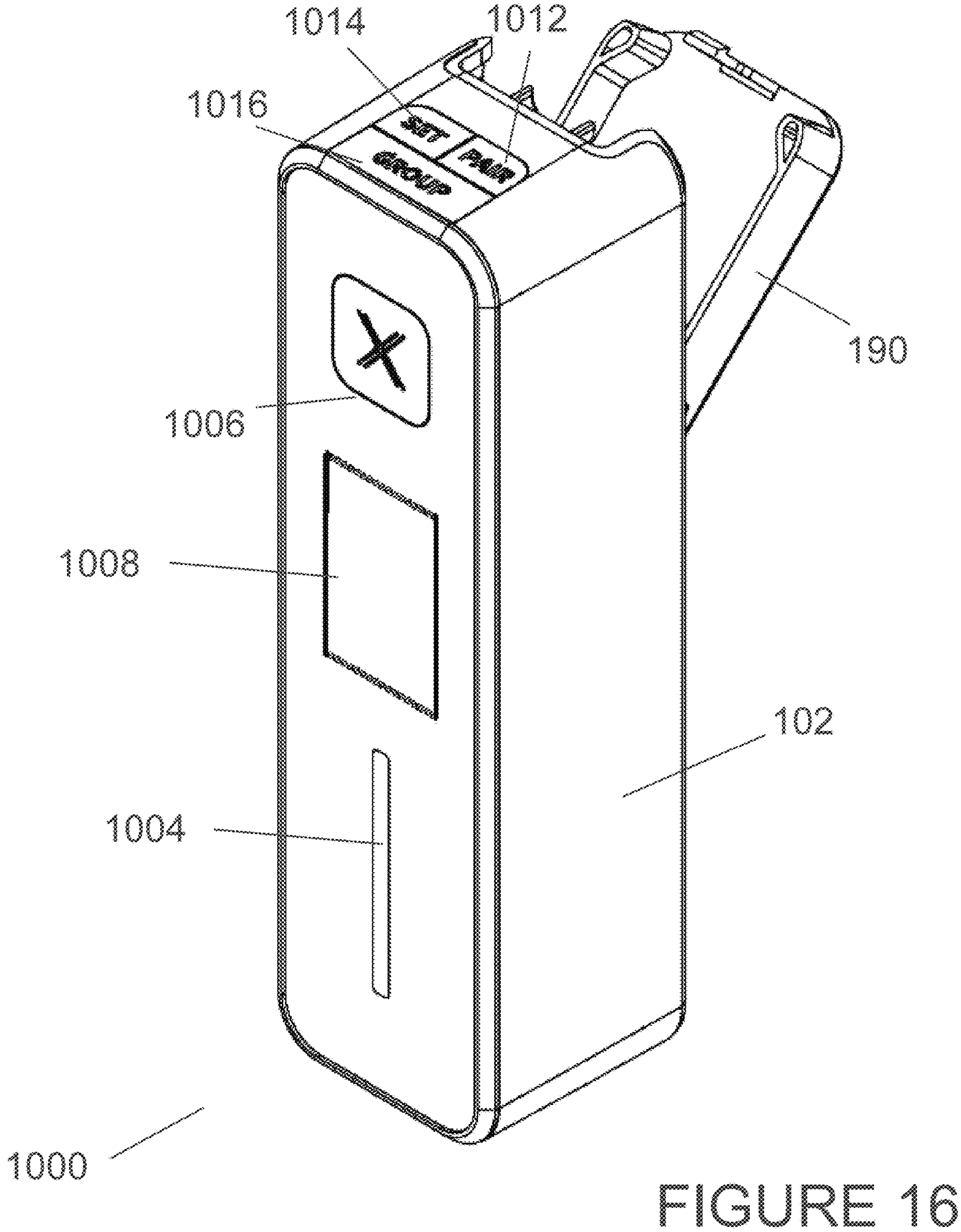
FIG. 16 is an isometric view of an external motor device, according to a further embodiment.

In various embodiments, alternative or additional input devices may be employed, such as various types of sensor (e.g., gesture sensor or other biometric sensor, accelerometer, light, temperature, touch, pressure, motion, proximity, presence, capacitive, and infrared ("IR") sensors). Other user input mechanisms include touch screen buttons, holographic buttons, voice activated devices, audio triggers, relay input triggers, or electronic communications triggers, among other possibilities, including combinations of these input mechanisms. FIG. 16 shows an alternative external motor 1000 that includes input devices 1004, 1006, 1012, 1014, and 1016 generally corresponding to input devices of motor 100. Additionally, the external motor 1000 includes a two-dimensional screen 1008 located on the front face of external motor 1000 above the LED strip 1004 and below the power button 1006. Two-dimensional screen 1008 may be a touch screen, and may provide various input/output functions such as a virtual keypad, an alphanumeric display, and a graphical user interface, among others.

Figure 4:
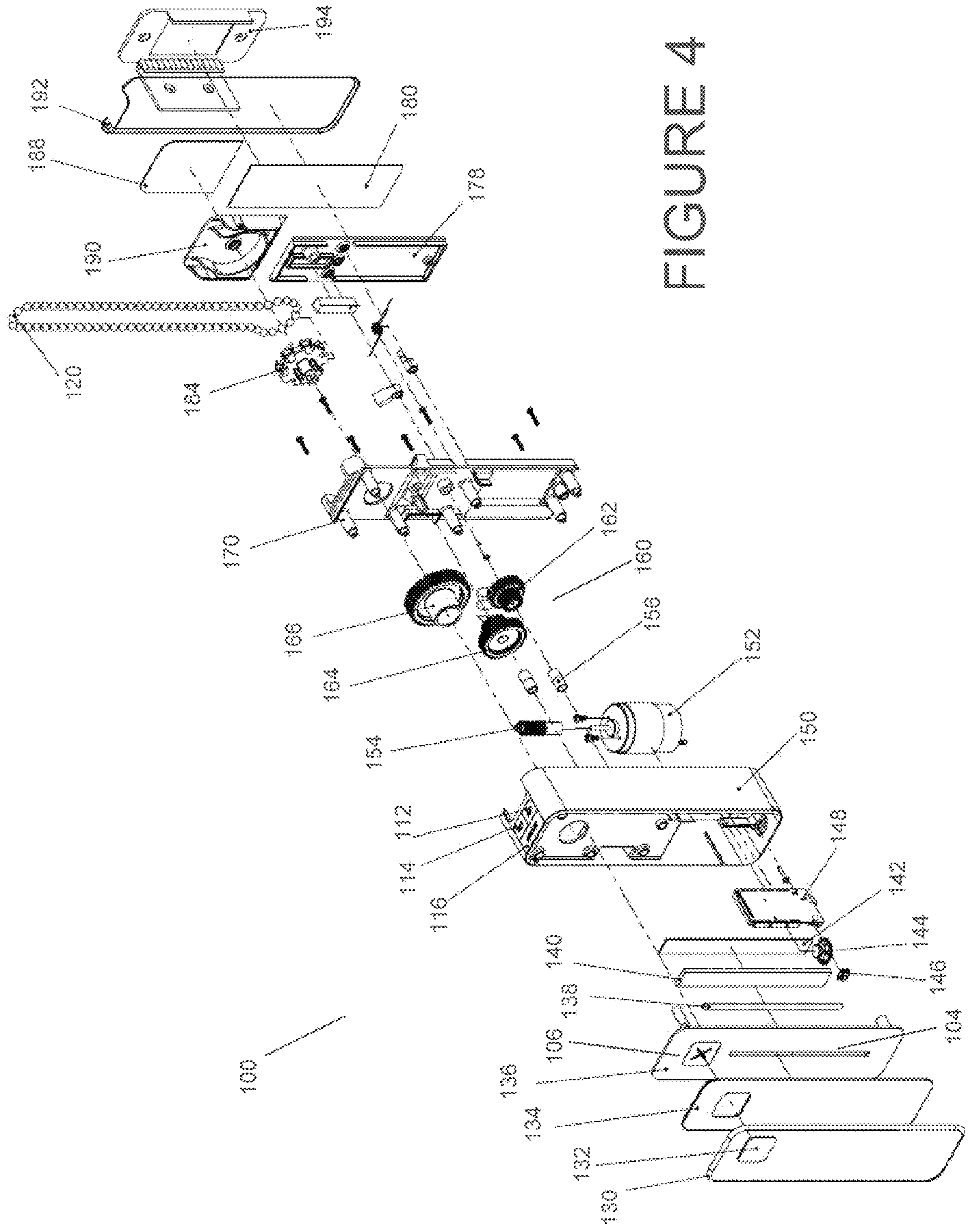
FIG. 4 is an exploded view of disassembled components of an external motor device, according to the embodiment of FIG. 3.

FIG. 4 is an exploded view of the components of the external actuator 100. Starting with the components at the front of the device at lower left, a front bezel 130 includes a power button glass plate that covers the power button 106. A front lid glass plate 134 includes an aperture 132 for the power button. Front lid 136 houses the power button 106 and serves as a transparent cover plate for the touch strip 104. Visual display components of the one-axis strip 104 include LED strip (also called LEDs) 140 and diffuser 138. The input sensor for one-axis strip 104 is a capacitive touch sensor strip 142. These components serve as an I/O device for the external motor 100, including an input interface that receives user inputs along an input axis, and a visual display aligned with the input axis. When fully assembled, the I/O device extends vertically on the exterior of the housing 102.

Other input/output components include a connector for communications and/or power transfer such as a USB port 146, and a speaker (audio output device) 144. The LEDs and audio outputs of external motor 100 can be used by state machines of external motor 100 to provide visual and/or audio cues to signal an action to be taken or to acknowledge a state change. Visual cue parameters of the LEDs 140 include, for example: (a) different positions of the LEDs indicators (blocks of LEDs) along slider 104; (b) different RGB color values of the LED lights; and (c) steady or flashing LED indicators (including different rates of flashing).

In examples of visual cues involving the group mode function, the user can press Group Mode button 116 once to cause external motor devices in the network to light up the LED display, informing the user which devices will be controlled. When a user successfully presses the Group Mode 116 button to program external motor 100 to control multiple external motors in its network, the LED strip 140 of all external motors being controlled will change color from steady blue to steady green.

In examples of visual cues involving the Set function, when a user initiates the calibration procedure by pressing and holding the Set button, the LED strip 140 will change to red and blue to inform the user that the external motor 100 is in calibration mode. When the user successfully completes the calibration procedure, the LED strip 140 will flash green to indicate that the shade is now calibrated.

In a visual cue example involving setting position, when a user taps a finger at a particular position along the capacitive touch strip 104, the LED strip 140 illuminates a block of LEDs at this last known position. This indicator informs the user of the position to which the shade will open or close.

In an example of audio cues, an audio alarm sounds to signal a safety issue. In a further example, the speaker 144 broadcasts directions to the user for a shade control function.

Motor drive components are housed between the main body 150 of housing 102 and a back lid 170. The motor components include motor 152 (e.g., a 6V DC motor), and various components of a drive assembly. Components of the drive assembly include a worm gear 154 that is driven by the motor rotation and coupled to a multi-stage gear assembly 160, and a clutch (not shown in FIG. 2). Gear assembly 160 includes helical gear 162 (first-stage gear), a first spur gear 164 (second-stage gear) rotatably mounted on sleeve bearings 156, and a second spur gear 166 (third-stage gear). Printed circuit board ("PCB") 148 houses control electronics for the external motor device 100.

Spur gear 166 is coupled via a clutch (not shown) to a sprocket 184, also called driven wheel, mounted at the rear of back lid 170. Continuous cord loop (chain) 120 is threaded onto sprocket 184 so that the motion of the drive components, if coupled to the driven wheel 184 by a clutch, advances the continuous cord loop 120.

The drive assembly is configured for engaging and advancing the continuous cord loop coupled to a mechanism for raising and lowering the window covering. The drive assembly includes driven wheel 184 and a coupling mechanism (152, 160, clutch) coupling the driven wheel 184 to the output shaft of the motor. The coupling mechanism is configured for rotating the driven wheel 184 in first and second senses. Rotation of the driven wheel in a first sense advances the continuous cord loop in the first direction, and rotation of the driven wheel in a second sense advances the continuous cord loop in the second direction.

Figure 5:
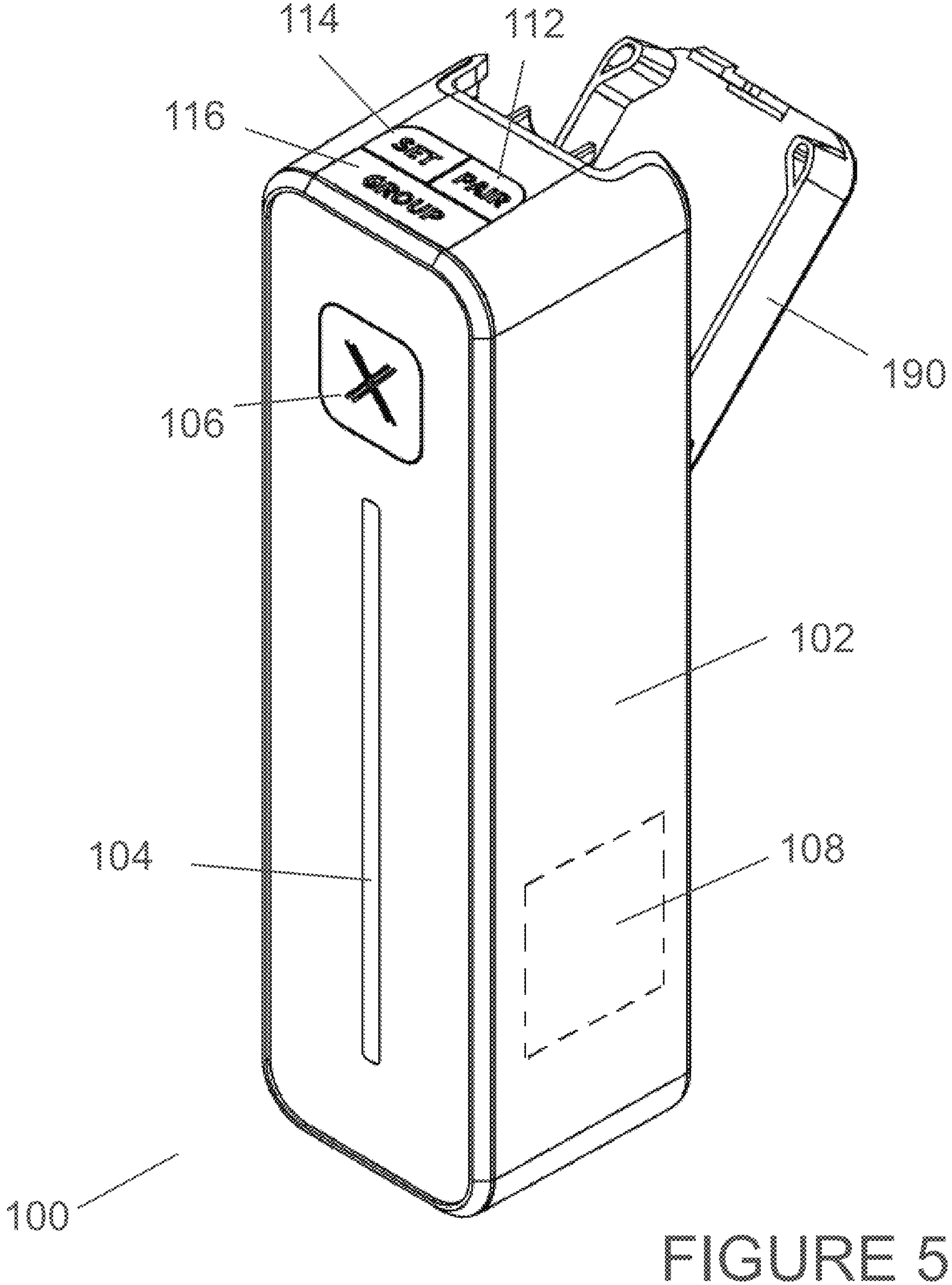
FIG. 5 is an isometric view of an external motor device with sprocket cover in an opened position, according to an embodiment.
Figure 6:
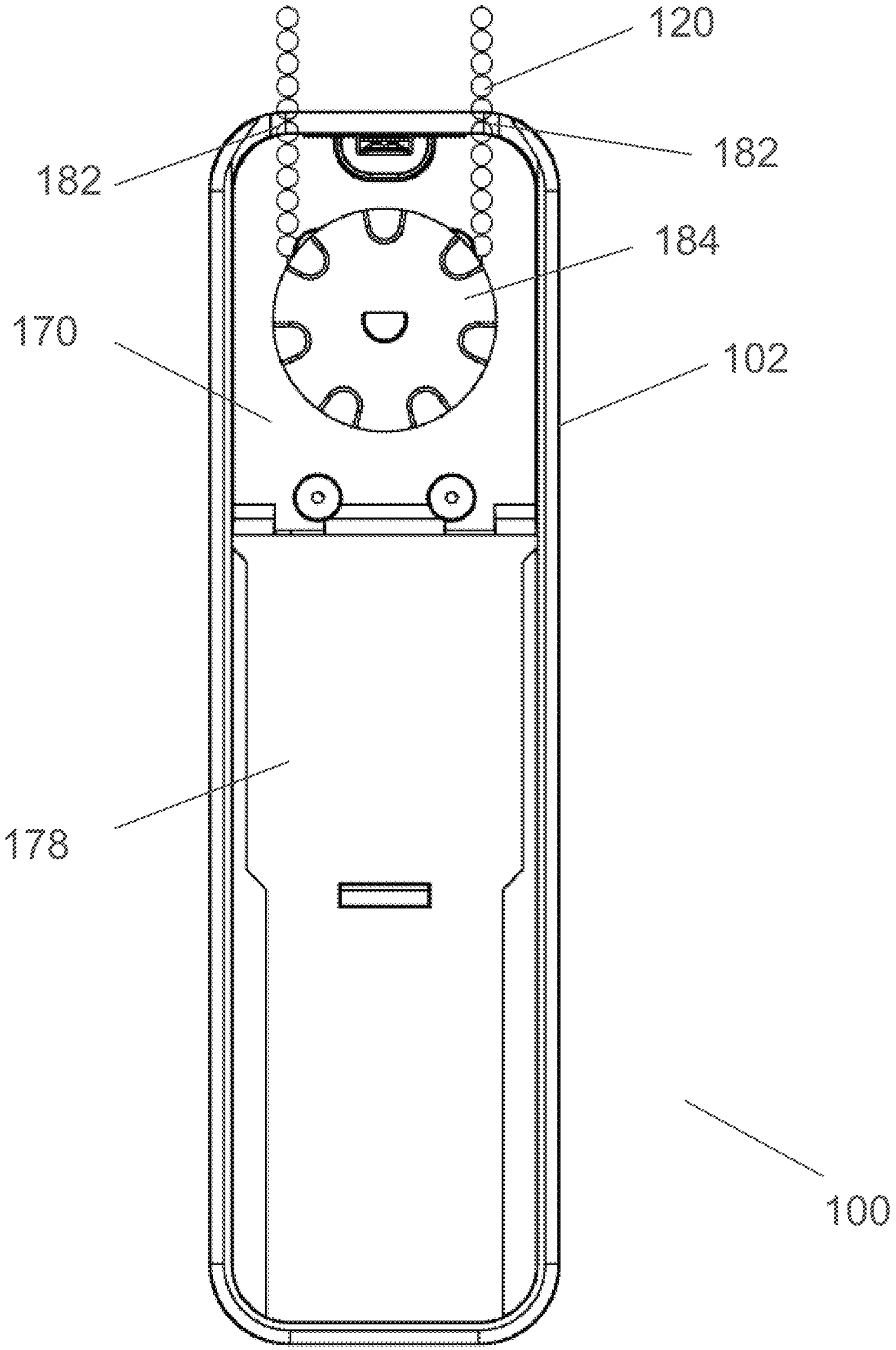
FIG. 6 is an elevational view of an external motor device as seen from the rear, in a section taken through a sprocket driven wheel, according to an embodiment.

Structural components at the back of external motor 100 includes a back lid cover 178, driven wheel cover 190, back lid glass plate 180, and sprocket lid glass plate 188. These components are covered by back bezel 192, which is coupled to a bracket 194 that serves as a mounting fixture for the external motor 100. FIG. 5 is an isometric view of an external motor device with driven wheel cover 190 in an opened position, according to an embodiment. External motor 100 includes a removable panel 108 at a side of housing 102 for access to interior components of external motor 100. FIG. 6 is an elevational view of an external motor device 100 as seen from the rear with driven wheel cover 190 removed. When sprocket cover 190 is closed, the housing 102 and driven wheel cover 190 define openings 182 at the top of external motor 100. The continuous cord loop 120 is routed through these openings during installation.

Referring again to FIG. 3, an input interface of external motor 100 may recognize various user input gestures in generating commands for opening or closing window coverings, and other system functions. These gestures include typing-style gestures such as touching, pressing, pushing, tapping, double tapping, and two-finger tapping; gestures for tracing a pattern such as swiping, waving, and hand motion control; as well as multi-touch gestures such as pinching specific spots on the capacitive touch strip 104. In the cases of a two-dimensional user interface such as touch screen 1008 of FIG. 16, additional user gestures may employed such as multi-touch rotation, and two dimensional pattern tracing. In an embodiment, a two-dimensional input interface 1008 can include a one-axis control that receives user inputs along an input axis.

The on-device controls of the present external motors incorporate a shade positional control I/O device such as slider 104. Slider 104 extends vertically on housing 102 along an input axis of the I/O device. The verticality of slider 104 naturally corresponds to physical attributes of shade positioning in mapping given inputs to shade control functions in a command generator, providing intuitive and user-friendly control functions. Examples of shade control I/O positional functionality via slider 104 include, among others:

(a) A gesture at a given slider position between the bottom and top of slider 104 corresponds to a given absolute position (height) of the blind as measured by an encoder or other sensor;

(b) A gesture at a given position between the bottom and top of slider 104 corresponds to a given relative position of the blind relative to a calibrated distance between a set bottom position and a set top position (e.g., a gesture at 25% from the bottom of slider 104 corresponds to a blind position 25% of the calibrated distance from the set bottom position to the set top position);

(c) Gestures at the top and bottom of the slider 104 can execute different shade control functions depending on the gesture. Pressing and holding the top of the slider 104 is a command for the blind to move continuously upward, while pressing and holding the bottom of the slider 104 is a command for the blind to move continuously downward. Tapping the top of the slider 104 is a command for the blind to move to its top position, while tapping the bottom of the slider 104 is a command for the blind to move to its bottom position.

(d) Upward and downward dynamic gestures (e.g., swiping) on slider 104 can be assigned different functions such as "up" and "down," or "start" and "stop."

Slider 104 provides a versatile I/O device that is well suited to various control functions of a window coverings motor drive system. Various shade control functions may be based on a one-axis quantitative scheme associated with the touch strip 104, such as a percentage scale with 0% at the bottom of the touch strip and 100% at the top of the touch strip 104. For example, the slider 104 can be used to set blind position at various openness levels, such as openness levels 0% open (i.e., closed), 25% open, 50% open, 75% open or 100% (fully) open, via pre-set control options. A user can command these openness levels via slider 104 by swiping, tapping, or pressing various points on the slider. In addition, the slider command scheme can incorporate boundary positions for state changes. For example, a slider input below the one-quarter position of the slider can command the window covering to close from 25% open to 0% open.

Various functions of slider 104 may employ a combination of the one-axis input sensing and one-axis display features of the slider. For example, the LED strip 140 can illuminate certain positions along the touch strip 104, with these illuminated positions corresponding to boundaries along the slider for state changes in a shade command structure.

Figure 21:
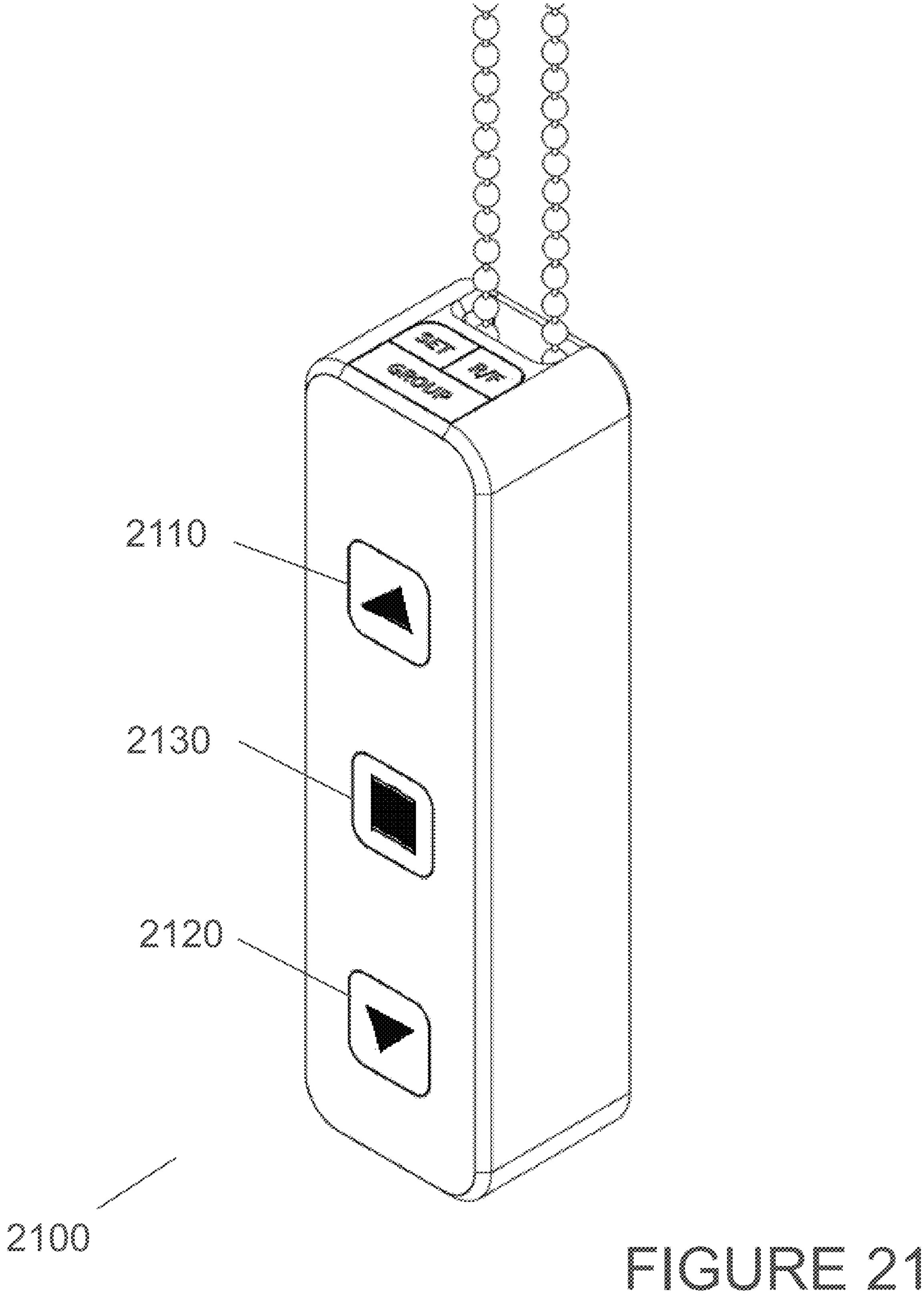
FIG. 21 is an isometric view of an external motor device, according to a further embodiment.

In the external motor device 2100 of FIG. 21, the vertical touch strip input device is replaced by capacitive touch buttons 2110, 2120, and 2130 for various motion states. Touch button 2110 actuates up motion, touch button 2120 actuates down motion, and touch button 2130 actuates an idle (stationary) motion state. For example, pressing an up button or down button may cause continuous up or down movement, tapping a button may cause window covering position to move up or down to a next set position, and double tapping a button may cause the window covering position to move to the top or bottom calibrated position.

Figure 7:
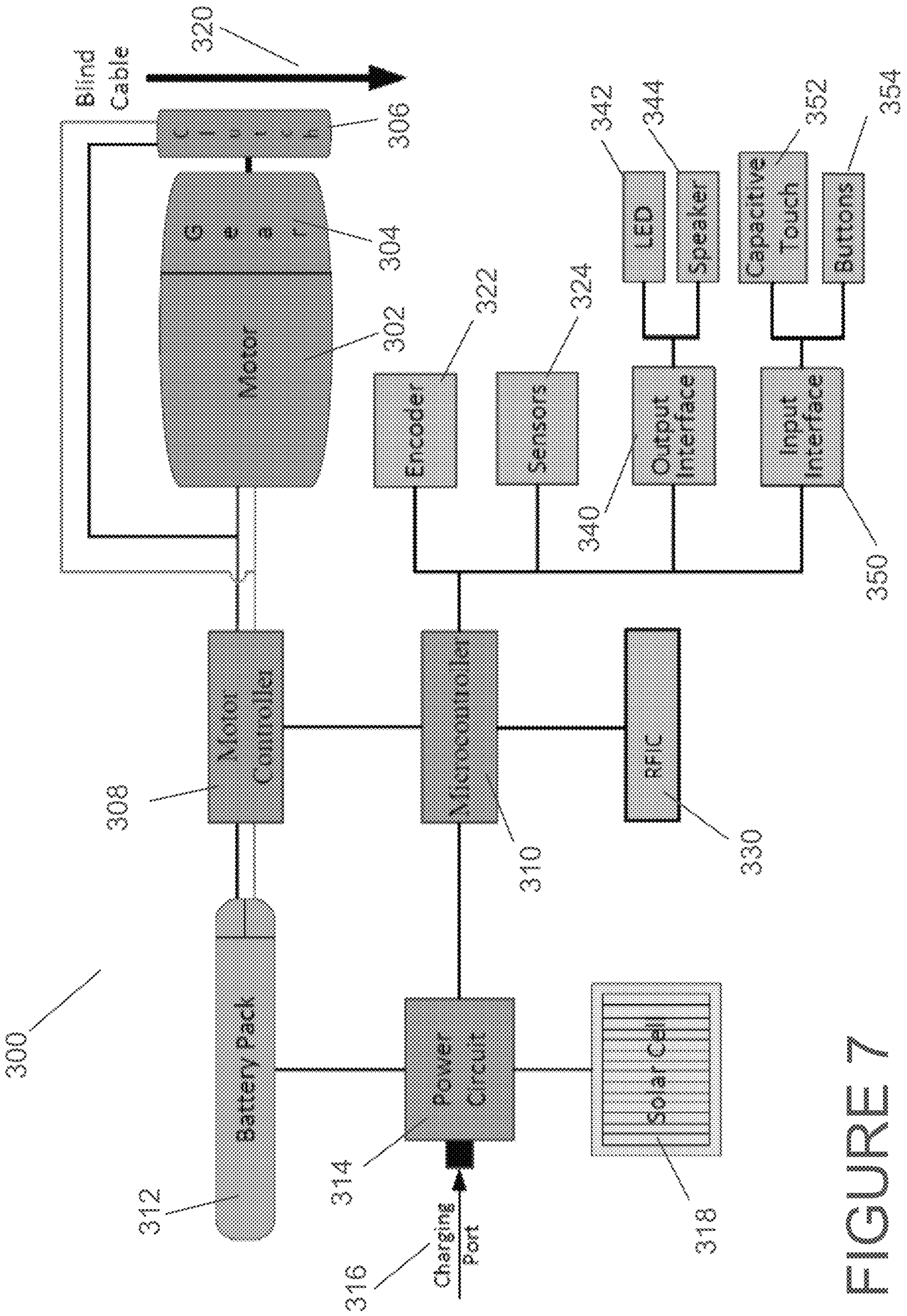
FIG. 7 is a block diagram of a control system architecture of an external motor device for a window covering system, according to an embodiment.

FIG. 7 is a diagram of a motor driven control system 300 for continuous cord loop driven window covering systems. Control system 300 includes DC motor 302, gear assembly 304, and clutch 306. DC motor 302 and clutch 306 are both electrically powered by a motor controller 308. Power sources include battery pack 312. Users may recharge battery pack 312 via power circuit 314 using a charging port 316, or a solar cell array 318.

The central control element of control system 300 is microcontroller 310, which monitors and controls power circuit 314 and motor controller 308. In an embodiment, microcontroller 310 and motor controller 308 are battery-powered. Inputs to microcontroller 310 include motor encoder 322 and sensors 324. In an embodiment, sensors 324 include one or more temperature sensors, light sensors, and motion sensors. In an embodiment, control system 300 regulates lighting, controls room temperature, and limits glare, and controls other window covering functions such as privacy.

In an embodiment, microcontroller 310 monitors current draw from the motor controller 308, and uses this data to monitor various system conditions. For example, using current draw sensing, during calibration the control system 300 can lift relatively heavy blinds at a slower speed, and relatively lighter blinds at a faster speed. In another embodiment, microprocessor 310 monitors the current draw of the motor to determine displacements from the constant current draw as an indication of position of the window covering and its level of openness. For example, assuming the blind is fully closed (0% openness), if the current draw is at an average of 1 amp while raising the window covering, the current draw may spike to 3 amps to indicate that the fabric is rolled up and the window blind is in a fully open position (100% openness).

In another embodiment, monitored current draw measurements are analyzed to determine the direction of the driven wheel, and thereby to determine the direction in which the window blind is opening or closing. In an example, the external motor drive rotates the driven wheel one way, then the opposite way, while monitoring current draw. The direction that produces the larger current draw indicates the direction in which the blind is opening. This method assumes that more torque (and greater current draw) is needed to open a window, and less torque (and lower current draw) is needed to close a window.

In addition, microcontroller 310 may have wireless network communication with various RF modules via radio frequency integrated circuit ("RFIC") 330. RFIC 330 controls two-way wireless network communication by the control system 300. Wireless networks and communication devices can include local area network ("LAN") which may include a user remote control device, wide area network ("WAN"), wireless mesh network ("WMN"), "smart home"

systems and devices such as hubs and smart thermostats, among numerous other types of communication device or system. Control system 300 may employ standard wireless communication protocols such as Bluetooth, WiFi, Z-Wave, ZigBee, and Thread.

Output interface 340 controls system outputs from microprocessor 310 to output devices such as LEDs 342 and speaker 344. Output interface 340 controls display of visual cues and audio cues to identify external motor control system states and to communicate messages. Input interface 350 controls system inputs from input devices such as capacitive touch device 352 and buttons 354. Input interface 350 recognizes given user inputs that can be mapped by microprocessor 310 to shade control functions in a command generator. For example, input interface 350 may recognize given user finger gestures at a touch strip or other capacitive touch device 352.

In an embodiment, encoder 322 is an optical encoder that outputs a given number of pulses for each revolution of the motor 302. The microcontroller 310 advantageously counts these pulses and analyzes the pulse counts to determine operational and positional characteristics of the window covering installation. Other types of encoders may also be used, such as magnetic encoders, mechanical encoders, etc. The number of pulses output by the encoder may be associated with a linear displacement of the blind fabric 204 by a distance/pulse conversion factor or a pulse/distance conversion factor. For example, with reference to FIG. 5, when the window blind 204 is at a fully closed position (0% openness), a button of external motor 210 can be pressed and held to have the window blind raise to the top of the window frame, and the button can be released once at the top. The external motor 210 is able to measure this travel as the total length (height) of the fabric 204 and thus determine its fully open position, fully closed position, and levels of openness in between.

In an embodiment, control system 300 monitors various modes of system operation and engages or disengages the clutch 306 depending on the operational state of system 300. In one embodiment, when DC motor 302 is rotating its output shaft under user (operator) control, or under automatic control by microcontroller 310, clutch 306 is engaged thereby advancing continuous cord loop 320. When microcontroller 310 is not processing an operator command or automated function to advance the continuous cord loop, clutch 306 is disengaged, and a user may advance continuous cord loop manually to operate the windows covering system. In the event of power failure, clutch 306 will be disengaged, allowing manual operation of the windows covering system.

Figure 8:
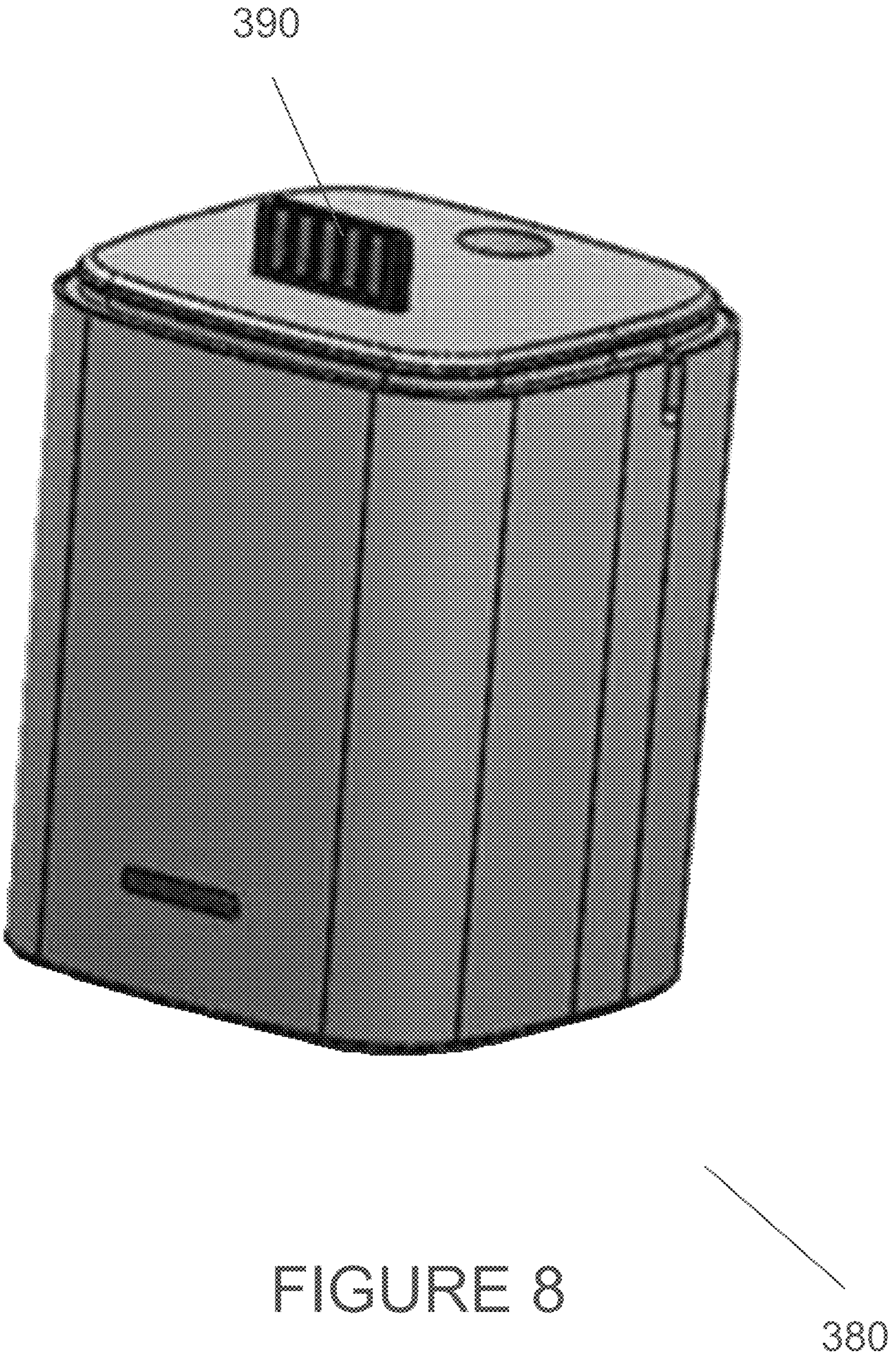
FIG. 8 is an elevation view of a battery pack of an external motor device, according to an embodiment.

Battery pack 312 may be an internal component of external motor device 100 contained within housing 102, or may be an external device releasably joined to housing 102. As shown in the embodiment of FIG. 8, a battery pack 380 provides a removable, rechargeable battery to power device 100. Battery pack 380 is shown as an external device that can be coupled to motor device 100 by plugging a power connector 390 into a socket (not shown) of the housing 102. In this example, the battery pack 380 can be inserted upward to plug into the socket that receives the power connector 390 from a bottom side. However, it is intended that other battery pack configurations may be used such that the battery pack can be plugged into the housing from any angle or direction. Further the battery pack can be configured with the power connector or other connection mechanism on any side of the battery pack to couple with a socket or coupling within the housing.

Figure 9:
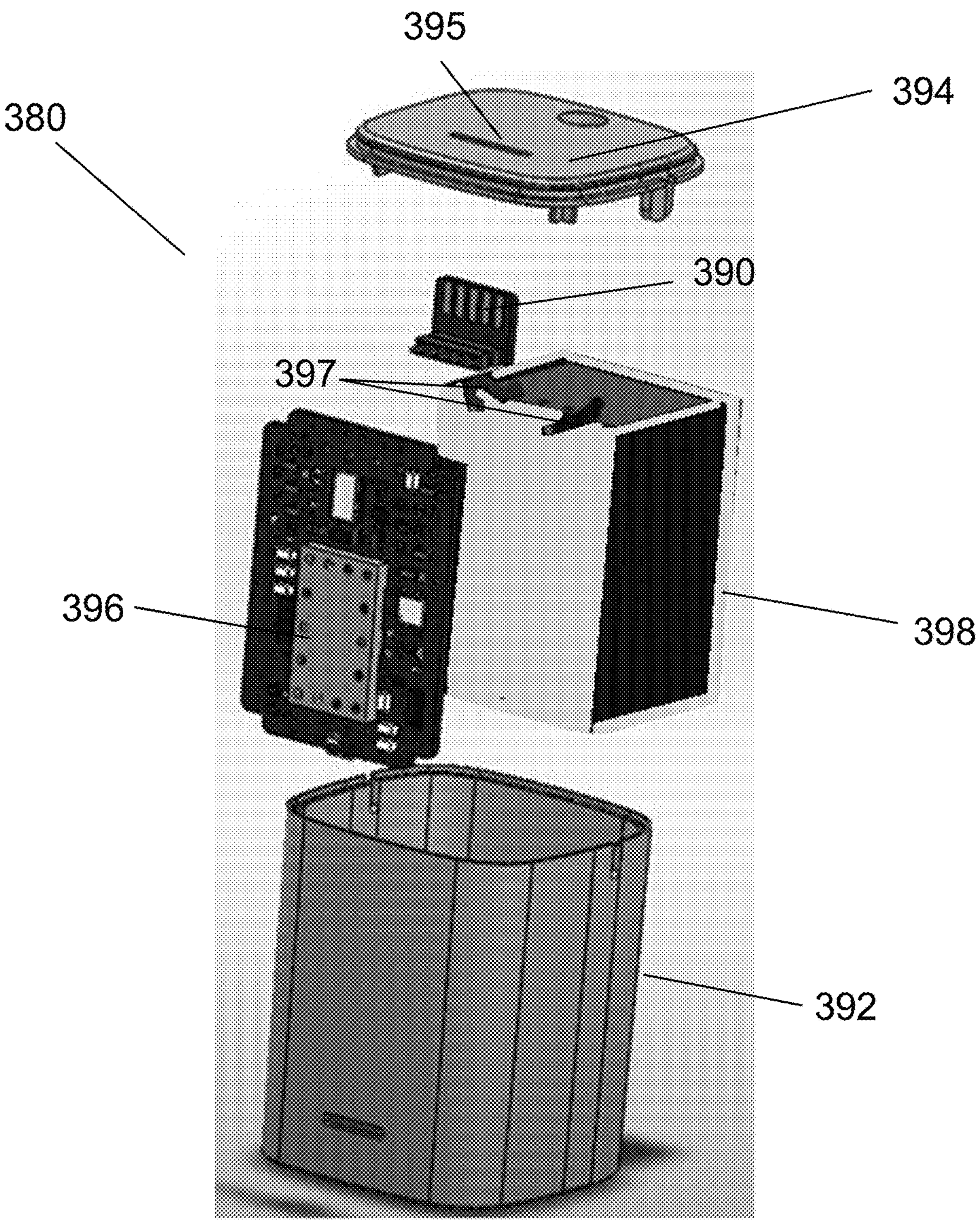
FIG. 9 is an exploded view of disassembled components of a battery pack for an external motor device, according to the embodiment of FIG. 8.
Figure 11:
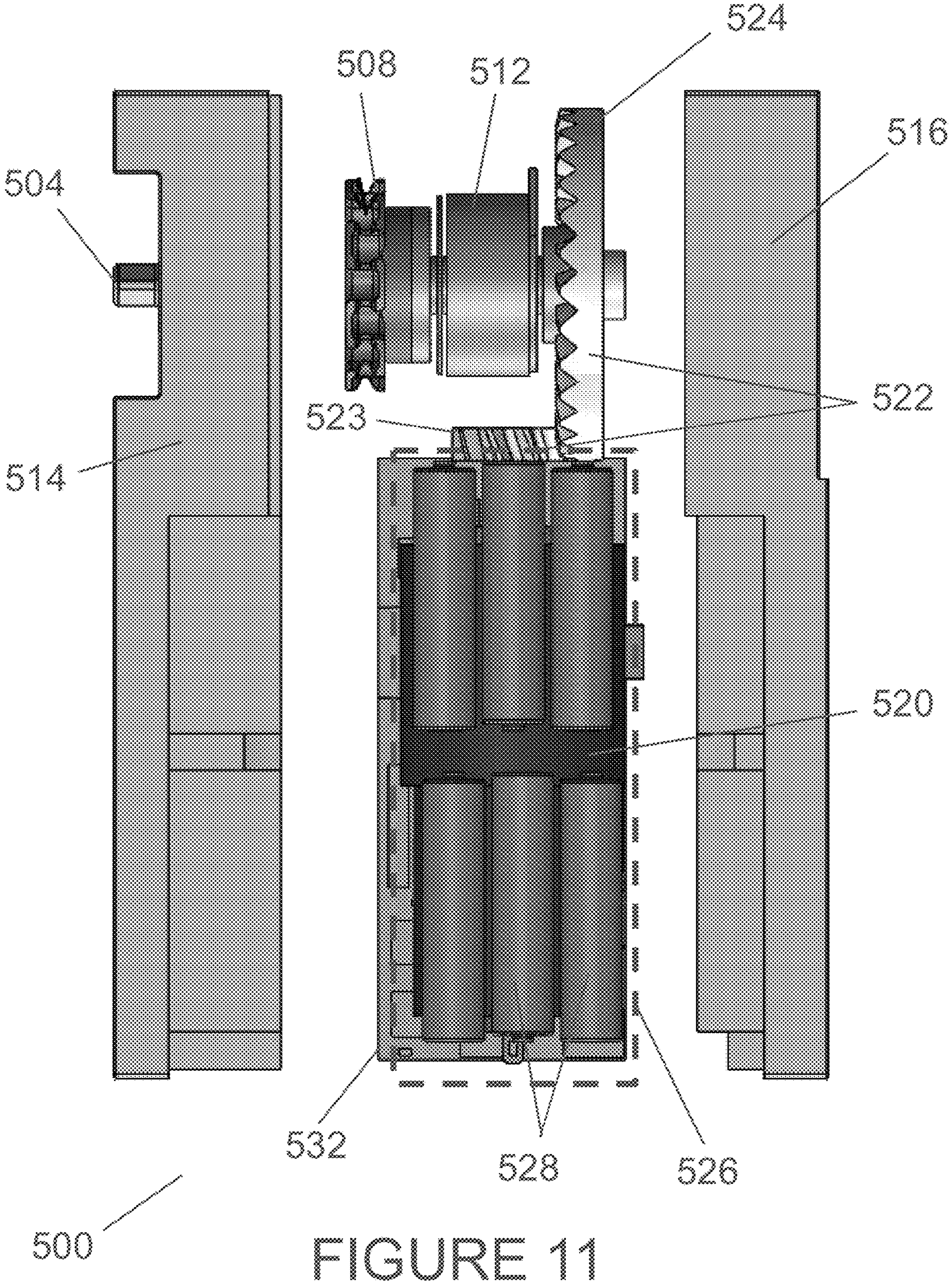
FIG. 11 is an elevation view of disassembled motor drive components for an external motor system, according to an embodiment.

As shown in FIG. 9, battery pack components include power connector 390, housing 392, lid 394, protection circuit board 396, and battery holder 398 (e.g., Li-Ion cells). As shown in FIGS. 8 and 9, the housing 392 of the battery pack 380 has rectilinear-shaped sides (e.g., a square) and may include curved edges. The form factor is not limited to this particular configuration and may be any configuration that can be accommodated by the housing 102 of the window control system. For example, in FIGS. 8 and 9, the battery pack 380 is an external device releasably joined to housing 102 that has a substantially square-shaped side and can house Li-Ion cells in the battery holder 398. In another example, as shown in FIG. 11, a battery pack 526 is an internal component of external motor device 100 that has more rectangular-shaped sides and can house six AAA rechargeable batteries 528.

In assembly of battery pack 380, battery cells (not shown) such as Li-Ion cells are positioned and/or secured in battery holder 398. Battery cells may be inserted onto or between electrical contacts within battery holder 398 with the electrical contacts coupled to positive and negative battery terminals (not shown), e.g., in a stack of vertically aligned battery cells. Electrical lines 397 within battery holder 398 are connected to PCB 396, which may be mounted within battery pack 380 separately from battery holder 398. The electrical connector 390 is mounted to PCB 396 extending vertically from the PCB. Battery pack 380 is closed by attaching lid 394 so that electrical connector 390 passes through slot 395 and extends above the battery pack 380.

Figure 31:
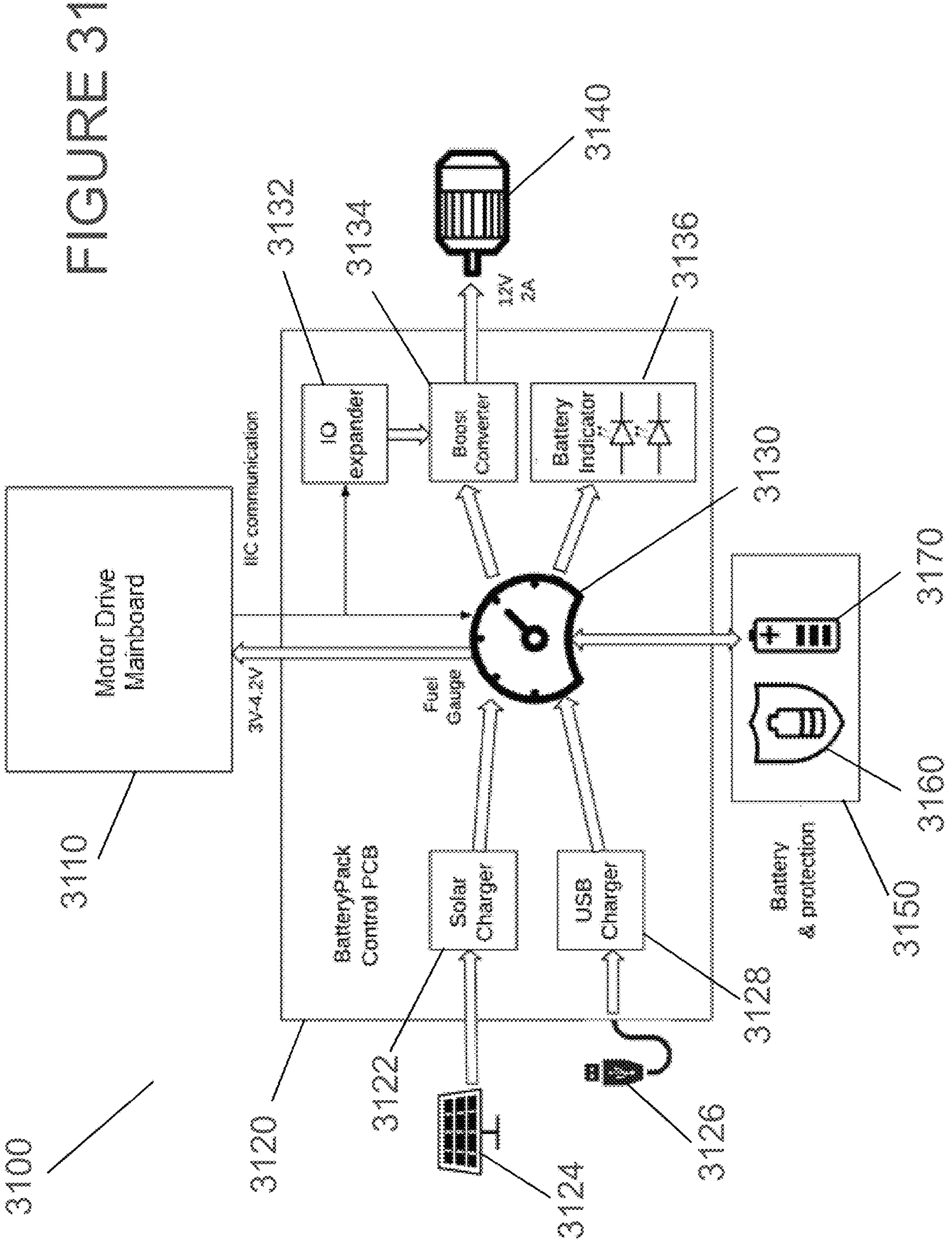
FIG. 31 is a block diagram of a power management system for an external motor device, according to an embodiment.

FIG. 31 is a block diagram of a power management system 3100 for an external motor device. Power management system includes a battery pack control PCB 3120 operatively coupled to a motor control mainboard 3110. Motor control mainboard 3110 provides positioning commands and other motor control commands to motor via battery pack control PCB 3120 and monitors operation of the battery pack control PCB 3120. Battery pack control PCB 3120 supplies DC power to motor 3140 (e.g., 12V 2A power) and to mainboard 2110 (e.g., in the range 3-4.2V).

Battery pack control PCB 3120 interfaces with various sources of DC power 3150, 3124, 3126, Battery and protection components 3150 include rechargeable battery 3170 and recharging protection board 3160. PCB 3120 also outputs DC power to battery and protection components 3150 as needed to recharge rechargeable battery 3170.

A second DC power input of battery pack control PCB 3120 is solar charger interface 3122, which receive DC power from photo-voltaic (PV) array 3124. Photo-voltaic cells of PV array 3124 use sunlight as a source of energy and generate direct current. In an embodiment, solar charger interface 3122 is a high energy device that incorporates energy harvesting technology. In an example, solar charger specifications include current: <1 uA; peak charging current: >20 mA; 4.2V charging compatible; very low charging voltage (e.g., 100 mV); and battery leak current: <1 uA.

A third DC power input of battery pack control PCB 3120 is USB charger interface 3128, which receives 5V DC power from USB cable 3126 plugged into a charger such as an AC power adapter. In an example, USB charger specifications include very low battery leak current, overvoltage protection, overcurrent protection, and 4.2V charging compatibility.

Battery pack control PCB 3120 includes a gauge 3130 (also referred to as a fuel gauge) that measures the level of remaining capacity in the battery under various operating conditions. Fuel gauge 3130 interfaces with various system components such as battery and protection components 3150 and battery indicator 3136. In an embodiment, fuel gauge 3130 incorporates a lower-power microcontroller to capture environmental data and calculate the remaining energy. In an embodiment, the fuel gauge microcontroller does not require initial calibration. In an example, fuel gauge specifications include sleep current: ~10 uA, 4.2V charging compatibility, and capacity: >12000 mA. In an embodiment, fuel gauge 3130 includes a display that shows the remaining energy of the battery. In an alternative embodiment, gauge 3130 may be an indicator light showing a light or a particular color (e.g., red, orange, green) representing the remaining capacity of the battery.

Battery pack control PCB 3120 includes a boost converter 3134 as motor drive. Boost converter 3134 is a DC-to-DC power converter that steps up voltage while stepping down current from its input (DC power source) to its output or load (DC motor 3140). By increasing the supply voltage, boost converter 3134 can reduce the number of needed cells in battery 3170. In an example, boost converter specifications include input voltage: 3V-4.5V; output: 9V-12V adjustable, 2A; shut down current (@Vin): <5 uA; efficiency: >90%.

In an embodiment, battery pack control PCB 3120 incorporates integrated circuits that include multiple power rails and power management functions within a single chip. IO expander 3132 provides additional inputs and outputs (I/O) on a microprocessor (MPU) or microcontroller (MCU) system. In an embodiment, IO expander 3132 is a GPIO expander, which includes an efficient data bus interface to reduce the I/O requirements of the MPU or MCU of motor drive motherboard 3110 as inputs to the boost converter 3134.

Figure 10:
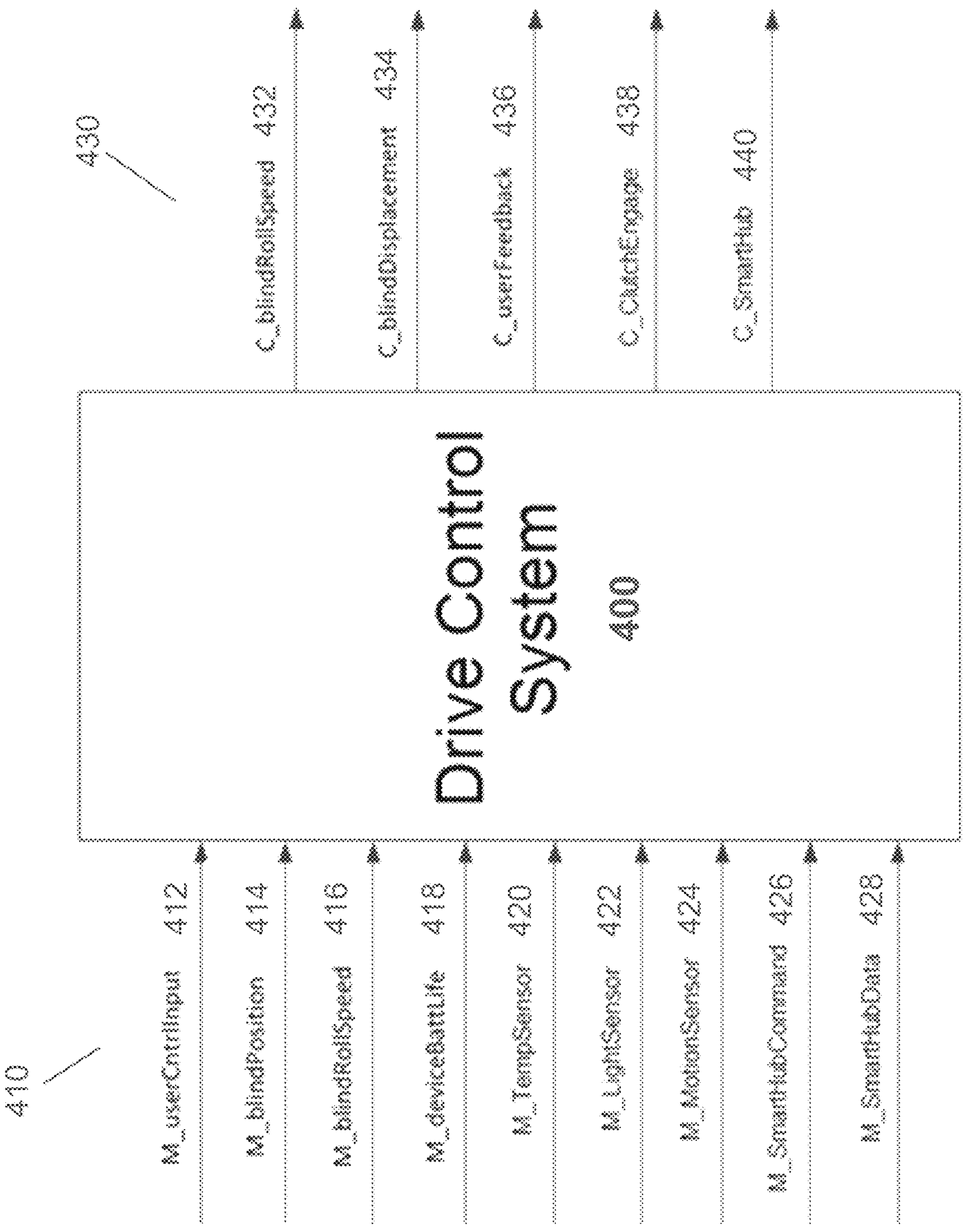
FIG. 10 is a schematic diagram of monitored and controlled variables of an external motor control system for a window covering system, according to an embodiment.

FIG. 10 is an input/output (black box) diagram of an external motor control system 400. Monitored variables (inputs) 410 of external motor control system 400 include: a user input command for blind control (e.g., string packet containing command) 412; distance of current position from top of blind (e.g., in meters) 414; rolling speed of the blind (e.g., in meters per second) 416; current charge level of battery (e.g., in mV) 418; temperature sensor output (e.g., in mV) 420; light sensor output (e.g., in mV) 422; motion sensor output (e.g., in mV) 424; smart-home hub command (e.g., string packet containing command) 426; smart-home data (e.g., thermostat temperature value in degrees Celsius) 428; and current draw of the motor 302 (e.g., in A) 430.

Controlled variables (outputs) 430 of external motor control system 400 include: intended rolling speed of the blind at a given time (e.g., in meters per second) 432; intended displacement from current position at a given time (e.g., in meters) 434; feedback command from the device for user (e.g., string packet containing command) 436; clutch engage/disengage command at a given time 438; and output data to smart-home hub (e.g., temperature value in degrees Celsius corresponding to temperature sensor output 420) 440.

In an embodiment, external motor control system 400 sends data (such as sensor outputs 420, 422, and 424) to a third-party home automation control system or device. The third-party system or device can act upon this data to control other home automation functions. Third-party home automation devices include, for example, "smart thermostats" such as the Honeywell Smart Thermostat (Honeywell International Inc., Morristown, New Jersey); Nest Learning Thermostat (Nest Labs, Palo Alto, California); Venstar programmable thermostat (Venstar, Inc., Chatsworth, California); and Lux programmable thermostat (Lux Products, Philadelphia, Pennsylvania). Other home automation devices include HVAC (heating, ventilating, and air conditioning) systems, and smart ventilation systems.

In another embodiment, external motor control system 400 accepts commands, as well as data, from third-party systems and devices and acts upon these commands and data to control the windows covering system.

In an embodiment, the external motor control system 400 schedules operation of the windows covering system via user-programmed schedules.

In an embodiment, sensor outputs of motion sensor 424 are incorporated in a power saving process. Sensor 424 may be a presence/motion sensor in the form of a passive infrared ("PIR") sensor, or may be a capacitive touch sensor, e.g., associated with a capacitive touch input interface of the external motor. In this process, the external motor system 400 hibernates/sleeps until the presence/motion sensor detects motion or the presence of a user. In an embodiment, upon sensing user presence/motion, an LED indicator of the external motor device lights up to indicate that the device can be used. In an embodiment, after a period of inactivity, the device enters a low power state to preserve energy.

In a further embodiment, external motor control system 400 controls multiple windows covering systems, and may group window covering systems to be controlled together as described above relative to Group Mode controls. Examples of groups include external motors associated with windows facing in a certain direction, and external motors associated with windows located on a given story of a building.

In another embodiment, external motor control system 400 controls the windows covering system based upon monitored sensor outputs. For example, based upon light sensor output 422, the window covering system may automatically open or close based upon specific lighting conditions such as opening blinds at sunrise. In another example, based upon motion sensor output 424, the system may automatically open blinds upon detecting a user entering a room. In a further example, based upon temperature sensor output 420, the system may automatically open blinds during daylight to warm a cold room. Additionally, the system may store temperature sensor data to send to other devices.

FIG. 11 is an elevation view of structural components and assembled working components from a motor driven subassembly 500, as seen from one side. Front housing 514 and rear housing 516 envelop the drive train and other operational components of the drive system 500, but are shown here separated from these components. DC motor 520 operates under power and control from PCB 532 and battery pack 526. Battery pack 526, shown in phantom in FIG. 11, is a battery holder with rectangular-shaped sides that can house six AAA rechargeable batteries 528, though the use of six batteries is for illustration purposes only. Batteries 528 may be nickel-metal hydride ("NiMH") batteries or lithium-ion polymer ("LiPo") batteries stacked within battery pack 526 in a vertical arrangement. Battery pack 526 can be located within the front housing 514 and rear housing 516 as shown or can be external to these housings. Drive system 500 may incorporate other forms of battery pack 526 and other arrangements of batteries 528 within battery pack 526. Battery pack 526 may be a removable component that can be inserted and removed at a bottom or side surface of an external motor device, such as by removing an access panel 108 at a side of external motor device 100 (FIG. 5). Batteries 528 may be recharged while battery pack 526 is housed within external motor device 100 or may be recharged after removing battery pack 526 from external motor device 100. PCB 532 may include power management components that control supply of power to motor 520, that control recharging of batteries 528, and that may include other functions such as monitoring and displaying state of charge of batteries 528. An example power management system is shown in FIG. 31.

DC motor 520 has a rotating output shaft that rotates driven wheel 508 via multi-stage gear assembly 522. Multi-stage gear assembly 522 includes a gear 523 in line with the motor output shaft and a face gear 524. Face gear 524 is coupled to driven wheel 508 by clutch system 512. Clutch 512 is a coupling mechanism that includes an engaged configuration in which rotation of the output shaft of the motor 520 (as transmitted by the multi-stage gear assembly) causes rotation of the driven wheel 508; and a disengaged configuration in which the driven wheel 508 is not rotated by the output shaft of the motor. In an embodiment, clutch 512 is an electrically operated device that transmits torque mechanically, such as an electromagnetic clutch or a solenoid. In another embodiment, clutch 512 is a two-way mechanical-only clutch that does not operate under electrical power.

Successive presses of the power button 504 toggle the drive assembly between engaged and disengaged configurations of the clutch system 512. Power button 504 corresponds to power button 106 in the external actuator embodiment 100 of FIGS. 1 and 2. In an embodiment, Power Button 106 turns on or off the device by engaging and disengaging the driven wheel or sprocket 508 respectively with the clutch system 512. In another embodiment, pressing the Power Button 106 triggers power-on and power-off of the external actuator 100.

In one embodiment utilizing a two-way mechanical-only clutch, when Power Button 106 is pressed in an 'on' position, the mechanical clutch will engage the driven wheel with the motor's output shaft and gear assembly. This is a tensioned position in which the mechanical clutch will not allow the driven wheel to be operated by manually pulling or tugging on the front chain/cord 122 or back chain/cord 124. In this engaged configuration, when the external motor 100 receives a shade control command from the on-device controls or another device, it will energize the motor to turn the output shaft and gear, which in turn will turn the driven wheel. When the Power Button 106 is pressed in an 'off' position, the mechanical clutch will disengage the driven wheel from the output shaft and gear, allowing for manual operation of the front chain/cord 122 or back chain/cord 124. In the disengaged configuration, if a shade control command is sent when the clutch is not engaged, the driven wheel will not turn.

In another embodiment, the clutch system is an electromagnetic clutch in which the driven wheel is always engaged with the output shaft and gear assembly. The electromagnetic clutch allows for manual operation of the front chain/cord 222 or back chain/cord 224. This clutch does not lock the driven wheel to the output shaft and gears, but when electrically energised will engage the driven wheel and output shaft and gears.

In a further embodiment, when external motor 100 is turned 'on' or engaged with the driven wheel via the Power Button 106, the system will recognize user tugging on the front chain/cord or the back chain/cord. In one embodiment, when a user tugs on the front chain/cord 122 while the external motor is tensioned, the LEDs associated with the touch strip 104 will flash to notify the user that she can control the device with the capacitive touch strip instead.

In another embodiment, when the external motor is turned 'on' or engaged with the driven wheel via the Power Button 106 and a user tugs on the chain/cord while the drive assembly is tensioned, external actuator 100 will recognize the user's action using sensors and/or encoders, and automatically lower or raise the blinds or take other action based on a command associated with the particular tugging action. The actions mentioned can include tugging on the front chain/cord 122 or the back chain/cord 124.

In an embodiment, a sensor and/or encoder of external motor 100 measures the manual movement of the cords via a "tugging" or pulling action of the cord by a user. Mechanical coupling of the sprocket 184 to the gear assembly 160 includes a certain amount of slack, such that user's tugging on the continuous cord loop 120 will cause a certain amount of movement of the sprocket and this movement will be recognized by a sensor or encoder (e.g., encoder 322, FIG. 7). Based upon the sensor or encoder output, a shade control command structure can include various shade control actions, and engage the motor to execute a given action. Tugging the cord while the external motor 100 is engaged and opening or closing the blind can send various commands, such as stopping the blind from opening/closing.

Examples of tug actions engaging the motor to execute shade control commands:

(a) Downward tugging sensed, engaging the DC motor in the same direction. For example, if the user tugs down the front chain/cord 122, the motor would operate and lower the window shade;

(b) Downward tugging sensed, disengaging the DC motor. For example, if the user tugs down the back chain/cord 124 while the motor is raising or lowering the window shade, the motor will disengage and stop the shade at that position.

(c) Downward tugging sensed, engaging the DC motor in an opposite direction. For example, if the user tugs down the back chain/cord 124, the motor will operate and raise the window shade.

Referring again to FIG. 3, the RF button 112 is used to pair or sync the external motor to a mobile phone via RF chips including, but not limited to, BLE ("Bluetooth Low Energy"), WiFi, or other RF chips. The RF button 112 can be used to pair or sync to third party devices such smart thermostats, HVAC systems, or other smart-home devices by means of forming a mesh network utilizing RF chips including various protocols. Protocols include, but are not limited to, BLE (Bluetooth Low Energy) mesh; ZigBee (e.g., ZigBee HA 1.2); Z-Wave, WiFi, and Thread.

The Group button 116 adds multiple external motors 100 within a network into groups in order to control these external motors simultaneously. In one embodiment, Group Mode allow a user to control all external motors within the group from one external motor 100. In an embodiment, to add additional external motors into a group, the user presses and holds the Group button 116 to enter pairing mode. The LED lights of touch strip 104 will flash orange to indicate the device is in pairing mode. In one embodiment, the user presses and holds, within a specified timeframe, the Group buttons of all external motors of the network she wants to add into the group. The LEDs color will turn from orange to green for all external motors that have been added to the group to indicate that pairing is successful. In another embodiment, the user can press the Group button 116 once to remove a device that is currently in the group, so that the Group button executes a toggle function to add or subtract the external motor from the group. In an embodiment, the user presses the Set button 114 to complete the pairing and linking of the external motors in the group.

To control a group of external motors that are linked or synced together, the user can activate group control by pressing the Group button 116. In an embodiment, this changes the LEDs on the capacitive touch slider 104 to a different color. All external motors in this group will light or flash the same LED color to indicate that the external motors are now in group control mode. The user can then set the position of the blind by using the capacitive touch slider control 104 to control all linked devices.

Figure 12:
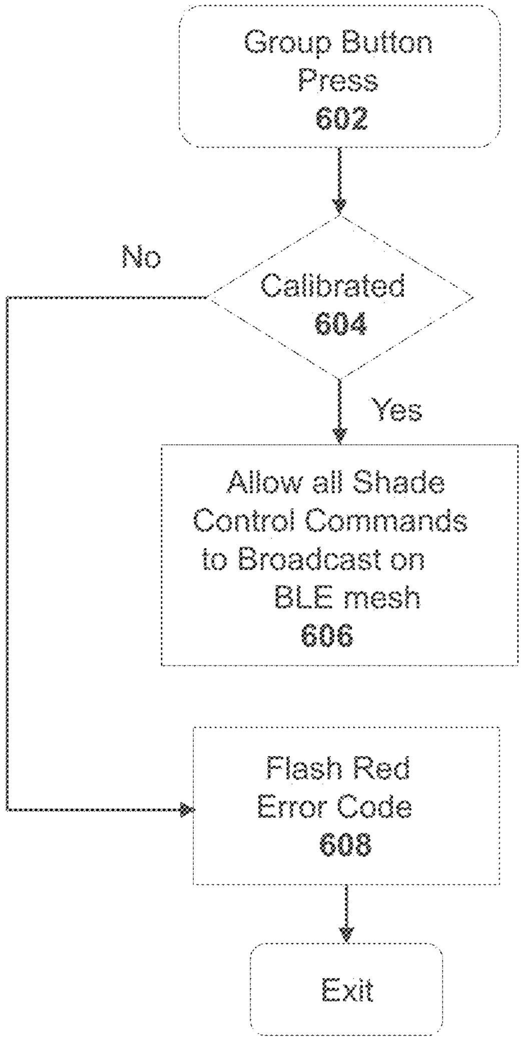
FIG. 12 is a flow chart diagram of a group mode routine, according to an embodiment.

FIG. 12 is a flow chart diagram of a Group Mode routine executed by an external motor 100. The group mode routine triggers shade control actions by other external motors within a group in response to a shade control command at the given external motor, once the user has set up the group. At 602 the routine commences upon pressing the Group button. Alternatively, the Group Mode routine may commence upon receipt of a Group Mode command from another device recognized by the external motor, such as a smartphone, smart hub, or third party device. At 604 the system determines whether the external motor has been calibrated. If the external motor has not been calibrated, the external motor's LED strip displays a flashing red error code. This notifies the user that the external motor must be calibrated before sharing shade control commands (positional commands) with other external motors in the group. If the external motor has been calibrated, the system allows all shade control commands to be broadcast to other external motors in the group on the network (e.g., BLE mesh). The system exits the Group Mode routine after flashing an error code 608, or after broadcasting the positional commands.

Figure 13:
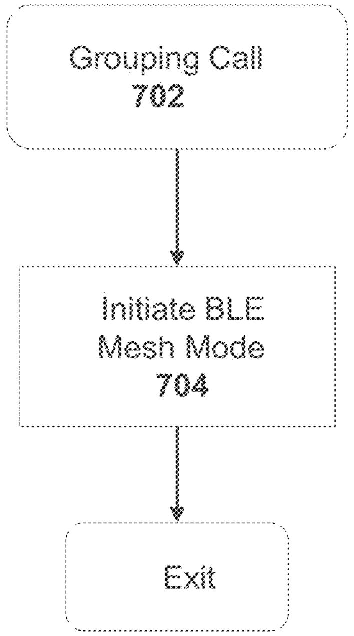
FIG. 13 is a flow chart diagram of a grouping mesh routine, according to an embodiment.

FIG. 13 is a flow chart diagram of a Grouping Mesh routine executed by an external motor in response to a grouping call received at 702. For example, a grouping call may be triggered at 606 in the Group Mode routine of FIG. 12. Upon receiving the grouping call, the external motor initiates BLE mesh mode 704, thereby communicating messages to other external motors in the group (BLE mesh) using a BLE protocol. For external motor networks that use another protocol 330 (FIG. 7) for RF communications, such as ZigBee, Z-Wave, WiFi, or Thread, the grouping call routine would be modified at 704 to initiate communications with other external motors in the group based upon the applicable protocol. Similarly, the grouping call routine can be modified to adapt to different mesh topologies of the external motor network, such as hub-and-spoke (star topology).

The Set button 114 is used for calibrating or pre-setting the maximum opening and closed position of the blind. After the user mounts/installs the external motor 100, the user can calibrate the device to manually set positions at which the blind is fully opened or fully closed. The user then presses the top portion of the capacitive touch slider 104 to raise the blinds all the way up. When the blind has reached the top position, the user again presses the Set button 114 to save the top position. The user then presses the bottom position of the capacitive touch slider control 104 to lower the blinds. When the blind has reached its bottom position, the user again presses the Set button to save the bottom position. The top and bottom positions set by a user can reflect preferences of the user and may vary from one external motor to another.

Figure 14:
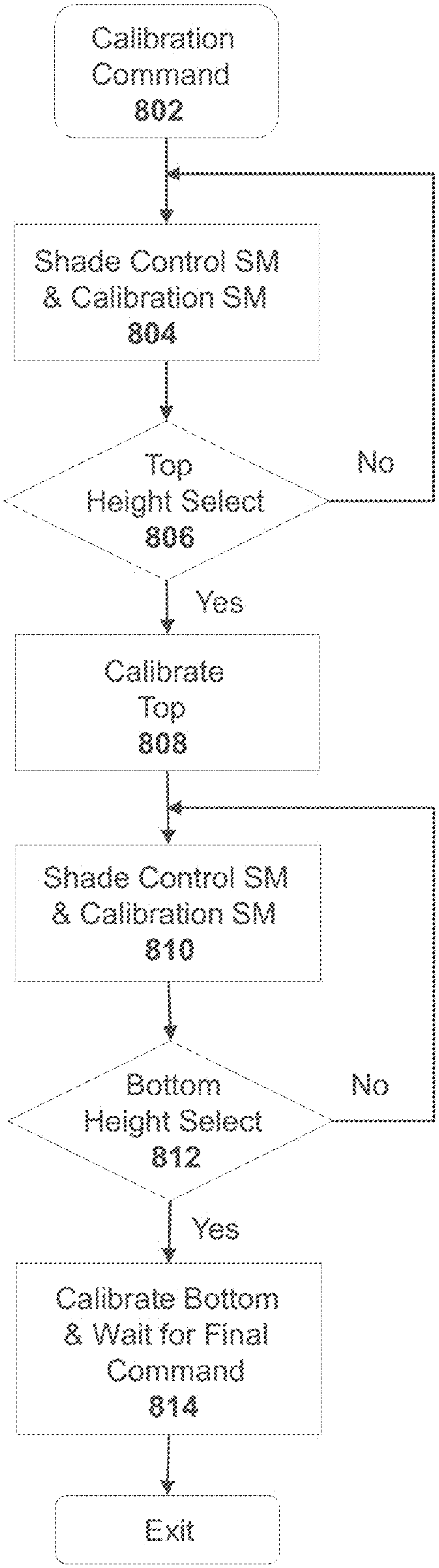
FIG. 14 is a flow chart diagram of a calibration routine for an external motor control system, according to an embodiment.

FIG. 14 is a flow chart diagram of a calibration routine executed by an external motor 100. The calibration routine commences with a calibration command 802, which can be effected by pressing and holding the Set button 114 of an external motor, or in some other way, e.g., input at a mobile device. At 804 the system passes control to the Shade Control state machine and to the Calibration state machine. The Shade Control state machine is discussed below with reference to FIG. 15. The Calibration state machine controls the command structure for LED indicators; calculates top and bottom positions selected by the user based on encoder pulse data; saves these top and bottom positions when confirmed by the user; and calculates distance between top and bottom positions to scale shade control commands to the calibrated positions. In these routines, the user can execute various motor control commands to move the blind to a desired top position. At 806 the system detects whether the user has selected and confirmed the top position by pressing the Set button. If so, the routine saves (calibrates) the top position at 808. At 810 the system again passes control to the Shade Control state machine and to the Calibration state machine. At 812 the system detects whether the user has selected and confirmed the bottom position by pressing the Set button and, if so, saves (calibrates) the bottom position at 814. Upon the user's final confirmation of calibration at 814, the system exits the calibration routine.

In the illustrated embodiment, the calibration procedure sets the top position followed by setting the bottom position. In an alternative embodiment, instead of setting the top position followed by calibrating the bottom position, the calibration procedure sets the bottom position followed by setting the top position.

In another calibration embodiment, the user presses and holds the Set button 114 for a limited period of time to reverse the direction of motion. In this embodiment, if the user presses the top part of the capacitive touch slider control 104 with the intent to raise the blinds, but external motor 100 instead lowers the blind, the user can press and hold Set 114 within a specified timeframe to reverse this direction. The user then presses the top portion of the capacitive touch slider control 104 to completely raise the blinds, and then presses the Set button 114 to set the top position. The user will then press the bottom portion of the capacitive touch slider control 104 to lower the blinds, and then press the Set button 114 to set the bottom position.

In a further calibration embodiment, the user can press Set for auto-calibration. During auto-calibration, the external motor determines top and bottom positions via predetermined sensor measurements.

Figure 15:
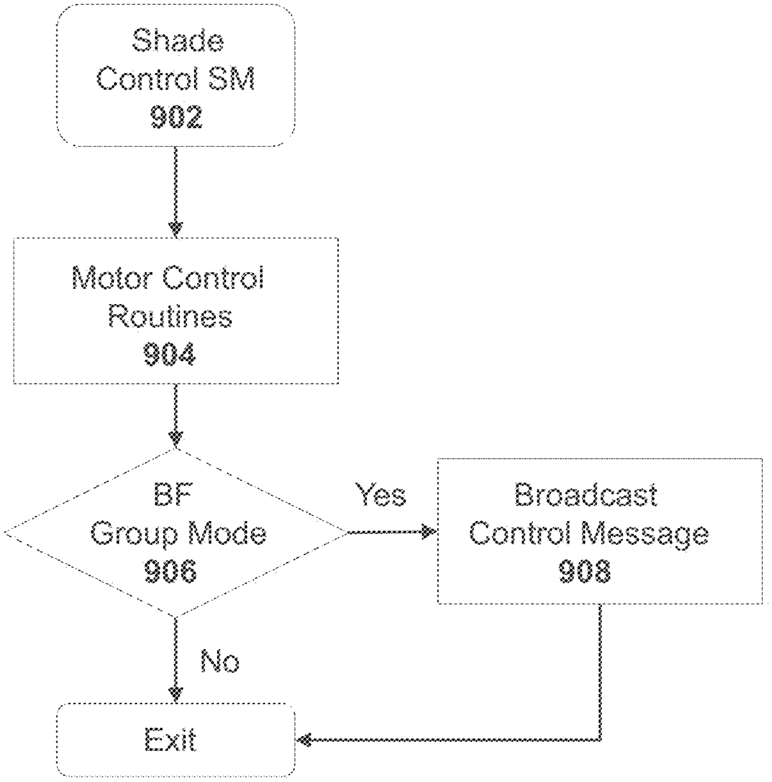
FIG. 15 is a flow chart diagram of a shade control routine, according to an embodiment.

FIG. 15 is a flow chart diagram of a Shade Control routine executed by an external motor 100. At 902 the system receives a command to pass control to the Shade Control state machine. At 904 the system passes control to motor control routines. Motor control routines start and stop the motor; move the motor in a selected direction (up/down); move the motor to a selected position; and regulate the speed of the motor. Motor control routines are typically triggered by user commands, but can also be automated, e.g., upon sensing a condition affecting safety. At 906, the system detects whether Group Mode is active for the external motor. If yes, the external motor's control system broadcasts 908 a shade control message to other motors in the group for execution. Shade control commands executed in response to the message 908 may vary among different external motors in a group. For example, shade control commands based on calibrated positions will vary depending on the top and bottom positions calibrated for each external motor. If the Group Mode is not active, the external motor exits the shade control routine at 906; otherwise it exits the routine at 908 after broadcasting the shade control message.

The I/O principles described above for external motor device on-device controls can be applied to various types of shade positional control I/O devices separate from the external motor device on-device control, such as mobile user devices. In various embodiments, the web application emulates the one-axis input sensing and one-axis display features of the external motor on-device controls described above. In various embodiments, the web application utilizes mobile device input technologies such as touch-screen inputs, gesture-based inputs, and GPS location sensing. For example, the web application control may accept inputs such as dragging, tapping, double tapping, multi-touch inputs, and gestures such as tracing a pattern, swiping, waving, and hand motion control. In various embodiments, a two-dimensional I/O device such as a 2D touch screen can be configured to act upon user input along a single axis, e.g., along a vertical axis or a horizontal axis of the touch screen.

FIGS. 17-20 and FIG. 22 are front views of a graphical user interface displayed on an electronic device 1705 (e.g., a mobile electronic device), which present various screens of an external motor control application. The window covering application position control screen 1700 of FIG. 17 includes a vertical slider control 1730 with a bar 1740 that can be set at a desired vertical position via touch screen input. In addition, graphical user interface 1700 includes up-button 1710 and down-button 1720 controls, which may receive various types of touch screen input. For example, pressing a button may cause continuous up or down movement, tapping a button may cause window covering position to move up or down to a next set position (e.g., set position of 75%), and double tapping may cause the window covering position to move to the top or bottom calibrated position.

Figure 18:
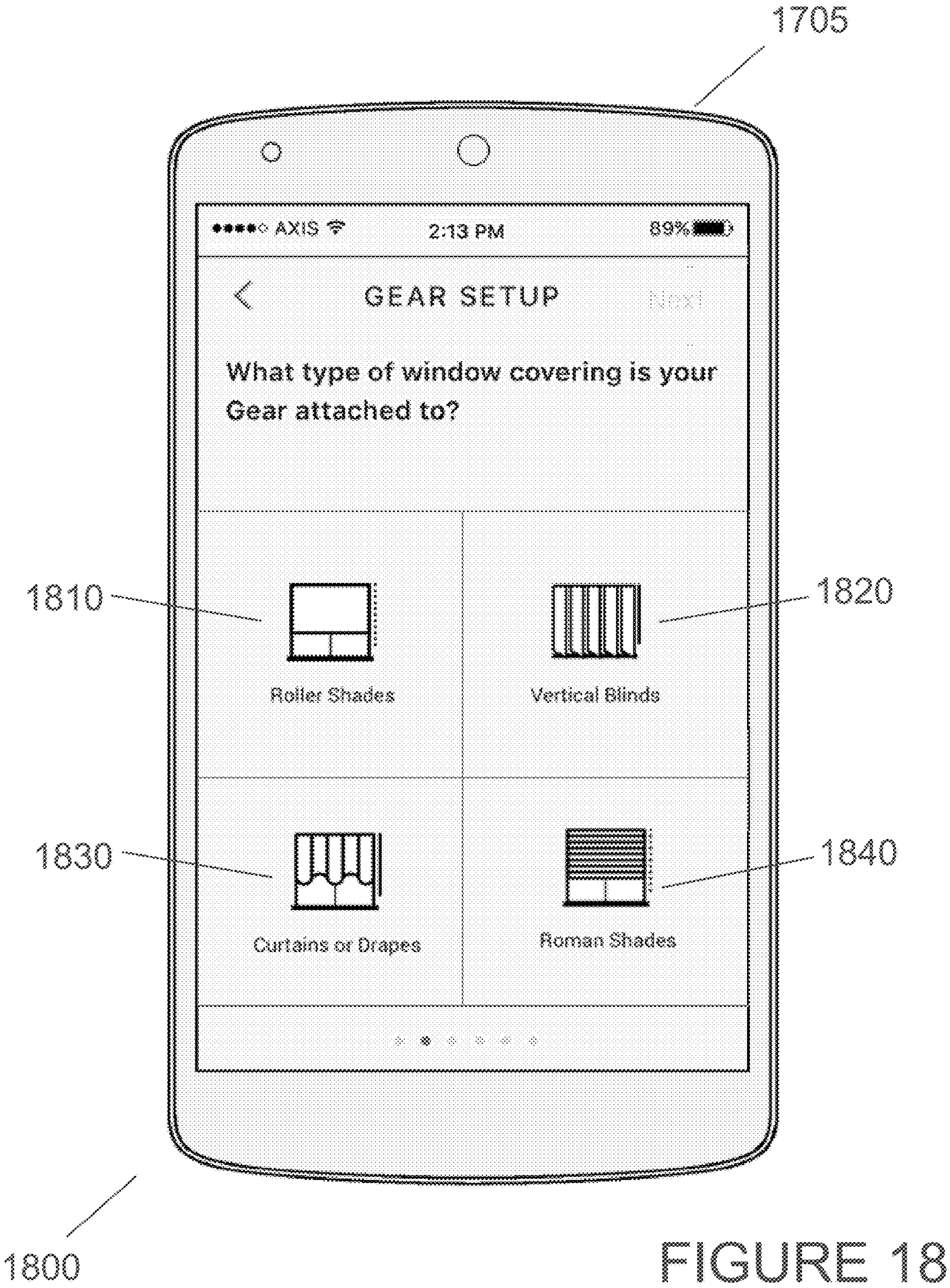
FIG. 18 is a front view of a graphical user interface displayed on an electronic device that presents a window covering type setup screen of an external motor control application, according to an embodiment.

The window covering application setup screen 1800 of FIG. 18 is used for setting up the external motor control application depending on what type or types of window covering devices are installed with external motor control. Window covering device type options include roller shades 1810, vertical blinds 1820, curtains or drapes 1830, and Roman shades 1840. Roller shades 1810 and Roman shades 1840 are characterized by vertical position control, i.e., the external motor device raises or lowers the roller shades or Roman shades. Vertical blinds 1820 and curtains or drapes 1830 are characterized by horizontal position control, i.e., the external motor device opens or closes the vertical blinds or curtains laterally, e.g., across the window frame.

Figure 19:
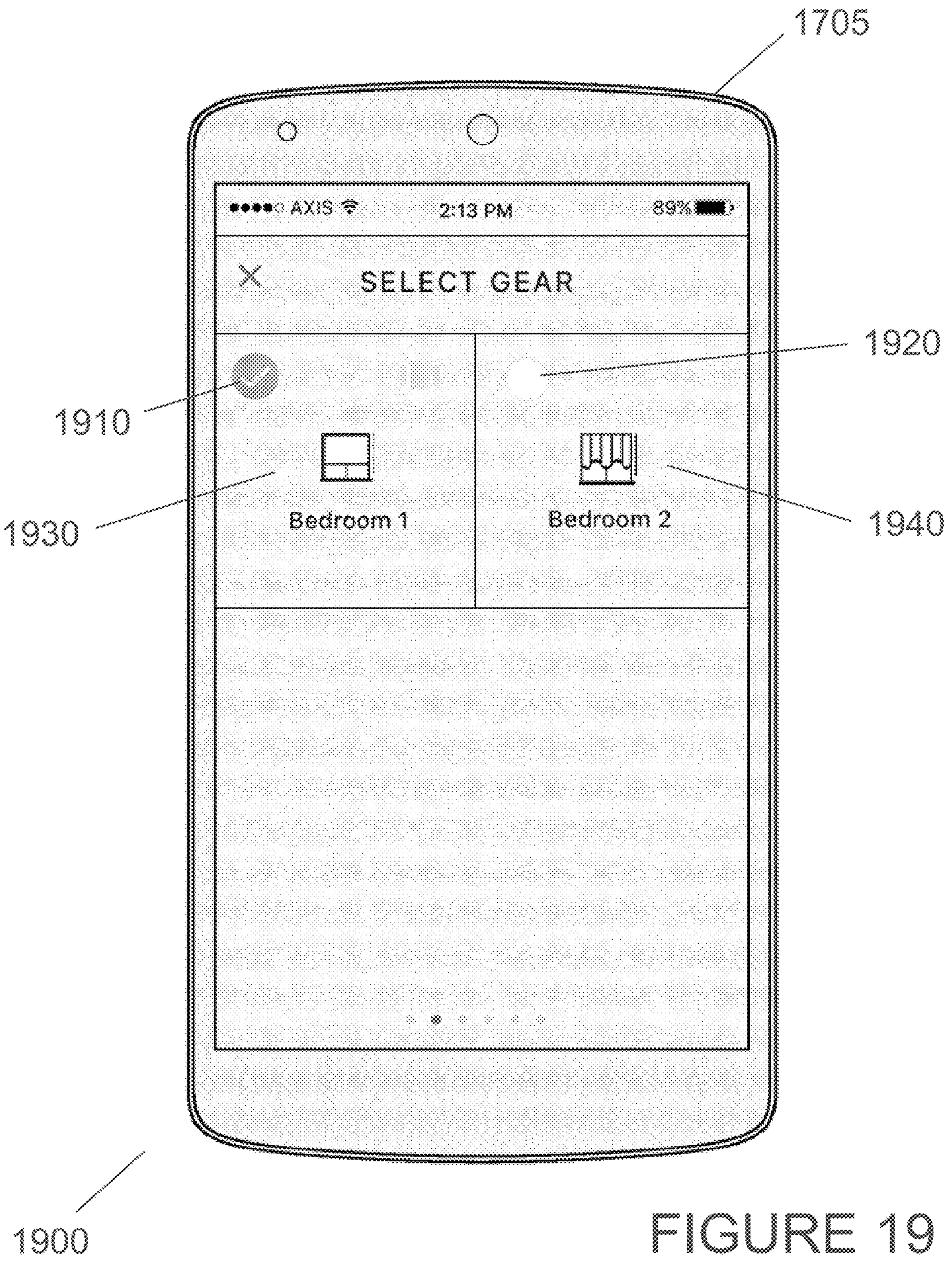
FIG. 19 is a front view of a graphical user interface displayed on an electronic device that presents a window covering device selection screen of an external motor control application, according to an embodiment.

As seen in the window covering application selection screen 1900 of FIG. 19, the external motor control application may be set up to control two or more external motor control devices, e.g., in different rooms or multiple devices in a given room. Following set-up, the user may select one of these devices for control via device selection screen 1900. In the exemplary embodiment, the user has set up two external motor window control devices: a roller shades device 1930 in Bedroom 1 and a curtains or drapes device 1940 in Bedroom 2. The user has selected device 1930 via radio button 1910 for control using the window covering application. Alternatively, the user can select device 1940 via radio button 1920. In various embodiments, in the event an external motor control device selected at the select screen 1900 is associated with roller shades 1810 or Roman shades 1840, the window covering application will display a position control application screen configured for vertical position control. In various embodiments, in the event an external motor control device selected at the select screen 1900 is associated with vertical blinds 1820 or curtains or drapes 1830, the window covering application will display a position control application screen configured for horizontal position control.

Figure 17:
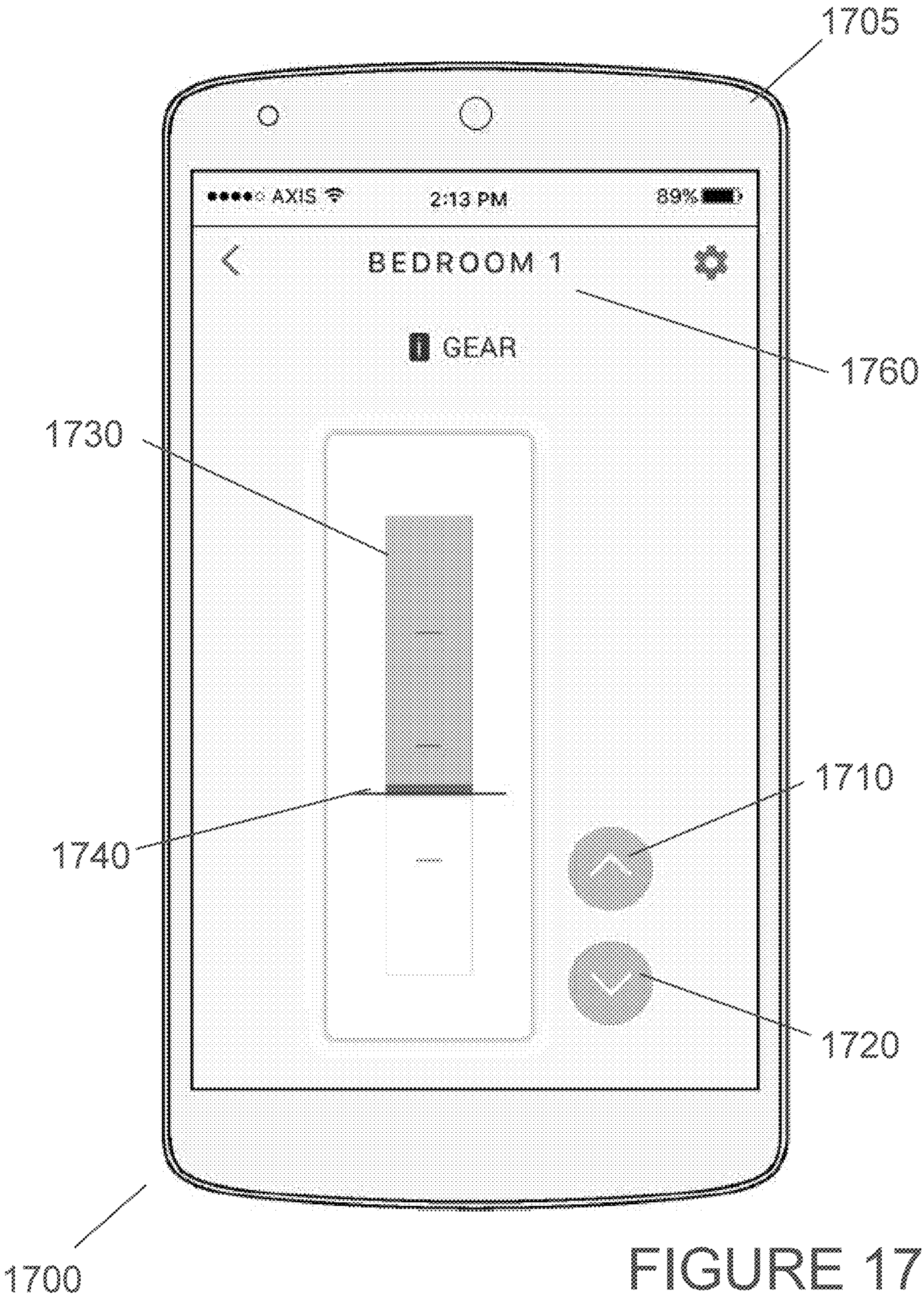
FIG. 17 is a front view of a graphical user interface displayed on an electronic device that presents a position control screen of an external motor control application, according to an embodiment.

In an example of use of the window covering application position control screen 1700 of FIG. 17, the control application has displayed position control screen 1700 following user selection of device location 1910 at selection screen 1900, as shown in window covering device header 1760, "Bedroom 1." For controlling raising and lowering of roller blind 1930, the position control screen 1700 displays a vertical slider control 1730.

Figure 20:
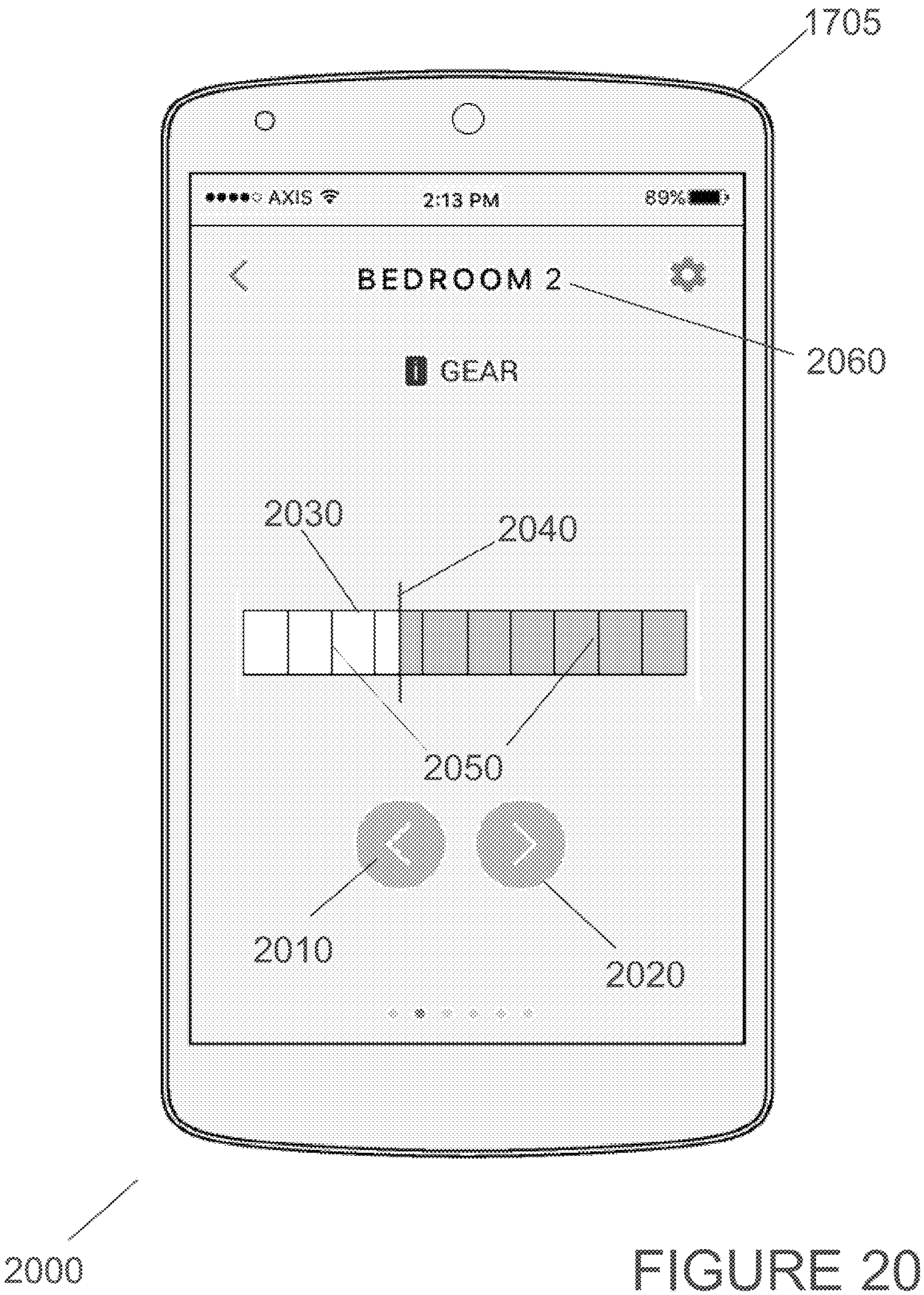
FIG. 20 is a front view of a graphical user interface displayed on an electronic device that presents a position control screen of an external motor control application, according to an embodiment.

The window covering application position control screen 2000 of FIG. 20 includes a horizontal slider control 2030 with a bar 2040 that can be set at a desired horizontal position via touch screen input. Horizontal slider control 2030 is divided into 10 segments of horizontal position indicated by vertical bars 2050, and the user can precisely move the window covering device to one of these preset positions via touch screen input (e.g., a position of 80%, where 100% is the right-most position). Position control screen 2000 also includes left-button 2010 and right-button 2020, which can be used respectively to cause movement of the window covering device toward the left or the right. In an example of use of the window covering application position control screen 2000 of FIG. 20, the control application has displayed position control screen 2000 following user selection of device location 1920 at selection screen 1900, as shown in window covering device header 2060, "Bedroom 2." For controlling horizontal opening and closing of curtains or drapes 1940, the position control screen 2000 includes a horizontal slider control 2030.

In addition to window covering application position control screens such as vertical position screen 1700 of FIG. 17 and horizontal position screen 2000 of FIG. 20, the window covering application can include one or more speed control screens. A speed control screen can include a control for setting an absolute value of motor speed as well as a direction of window covering velocity (e.g., up or down, or left or right). Additionally, a speed control screen can include controls to select one of several preset speed settings, such as a radio button control to select one of settings Idle; Low; Medium; and High.

The mapping of given user gestures to given shade control commands, herein also called "positional commands," can distinguish between commands applicable only to the local external motor 100, versus commands applicable to multiple external motors. In an example, double tapping the top of a capacitive touch slider design commands the system to provide 100% openness for all window coverings in a pre-set group of window blinds, rather than just the local blind. In another example, two-finger tapping commands the system to open all the window coverings connected within the network.

Figure 22:
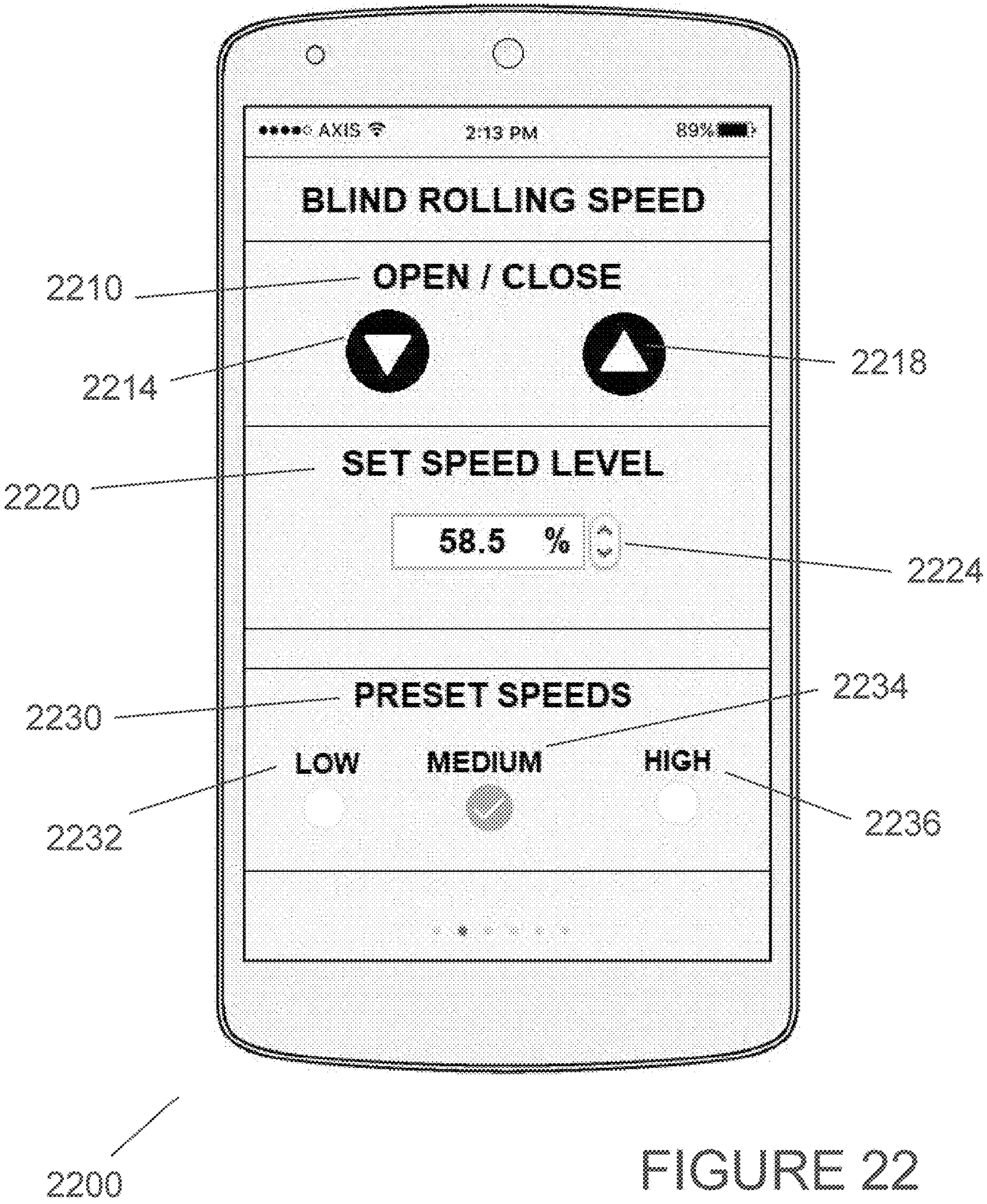
FIG. 22 is a front view of a graphical user interface displayed on an electronic device that presents a speed control screen of an external motor control application, according to an embodiment.

In an embodiment, a window covering application can control the direction and speed of advancing and retracting a window covering. Speed control screen 2200 of FIG. 22 is used to set the direction (open/close) and speed of movement of a window covering. In the illustrated embodiment, the user has selected a roller blind at the window covering device selection screen of FIG. 17, and speed control screen 2200 controls the vertical direction and rolling speed (e.g., in meters per second) of the roller blind. Open/close control 2210 displays down-arrow 2214 and up-arrow 2218 icons that respectively cause the window blind controller to lower (open) and raise (close) the roller blind. Speed control screen includes two different modes 2220, 2230 for the user to select blind rolling speed, and normally only one of these modes is used at a time. Set Speed Level mode 2200 includes a control 2224 that selects a percent value between 0% (roller blind stationary, or idle state) and 100% (maximum speed), inclusive. In various embodiments, percentage control 2224 may select a percent value within a continuous range, or may select a percent value from a range of discrete values. For example, as shown percentage control selects a percent value with one decimal place, i.e., 58.5% of maximum speed. Preset Speeds mode 2230 includes several radio buttons, of which one can be chosen to select one of a limited number of predetermined roller blind rolling speeds. Here, the predetermined speeds include a low 2232, Medium 2234, and High 2236 speeds. In an embodiment, the maximum speed in mode 2220 and the preset speeds in mode 2230 are default speeds. In an embodiment, the maximum speed in mode 2220 and the preset speeds in mode 2230 are set by the user during device set-up.

Figure 23:
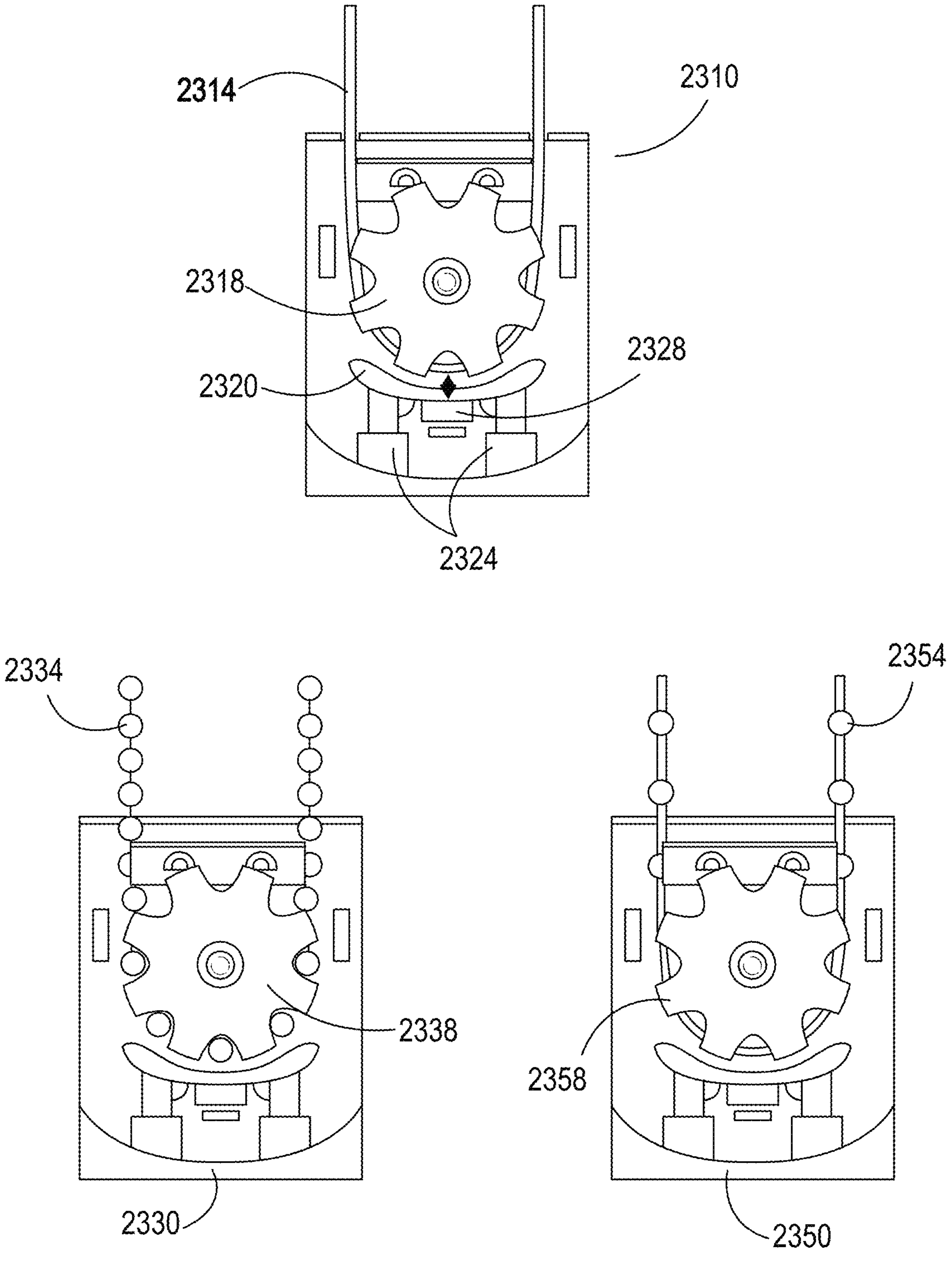
FIG. 23 is an elevational view of upper portions of three external motor devices as seen from the rear with cover removed, according to an embodiment.

In an embodiment, the external motor device may include various interchangeable driven wheels that are compatible with different types of continuous cord loop chains or cords. The user may attach a suitable driven wheel to a rotatable shaft of the motor drive assembly during installation or set-up of the external motor device. FIG. 23 shows at 2310 a drive wheel assembly including a cord-type continuous cord loop 2314 mounted to a pulley-type driven wheel 2318. In an embodiment, the pulley wheel 2318 is compatible with cords of a given range of thicknesses and normal operation, the cord 2314 engages pulley wheel 2318 via frictional engagement. Drive wheel assembly includes a guide rail 2320 for the continuous cord loop 2314. Guide rail 2320 is a curved rail supported by support legs 2324 in proximity to or contact with a segment of the continuous cord 2314. In disclosed embodiments, drive wheel assembly 2310 includes a continuous cord loop sensor 2328 mounted to guide rail 2320. FIG. 23 shows at 2330 a metal bead continuous cord loop chain 2334 mounted to a sprocket-wheel driven wheel 2338 with cogs that mesh with the metal beads of continuous cord loop chain 2334. FIG. 23 shows at 2350 a plastic bead continuous cord loop chain 2354 mounted to a sprocket-wheel driven wheel 2358 with cogs that mesh with the plastic beads of continuous cord loop chain 2354.

In conventional practice, the primary concern is that cord/pulley motor drive system are vulnerable to slipping during continuing operation. However, frictional engagement of the cord by the pulley drive can withstand forces applied during normal operation without slipping, and the primary cause of positioning error is material fatigue. One form of material fatigue in a synthetic or natural fiber cords is prolonged wear, which can be characterized as “creep.” Creep describes the tendency of elastic materials to move slowly or deform permanently under prolonged exposure to a continuously or continually applied mechanical load.

Conventional pulley drive systems typically focus on velocity differences during pulley drive as the most pressing concern in most practical uses of pulley drive systems. However, in motor drive systems for window coverings, another concern is relative motion between the window covering drive mechanism (e.g., continuous cord loop cord) and the pulley wheel that occurs from the difference in speed. This relative motion due to creep causes the cord to move relative to the sprocket wheel during continuing operation, which causes the final position of the window covering to move or shift over time and introduce error into position control. For example, the position control system measures relative position of the window covering by measuring encoder counts at the motor, and any movement or shift of the continuous cord loop cord relative to the pulley driven wheel can compromise accuracy of the position control system. Disclosed embodiments attempt to address the problem of creep in pulley wheel motor drive systems for cord-type continuous cord loops. Embodiments disclosed herein incorporate a continuous cord loop sensor system to address this problem.

In continuous cord loops chains driven by a sprocket wheel, stresses on the continuous cord loop chain during continuing operation can stretch or elongate the continuous cord loop chain. For example, metal beaded chains and ball chains can stretch due to stresses on the continuous cord loop chain when the motor accelerates from an idle state to full operating speed. Embodiments described herein incorporate a continuous cord loop sensor system to maintain accuracy of automated positioning control of window coverings in the event of stretching of the continuous cord loop chain.

Figure 24:
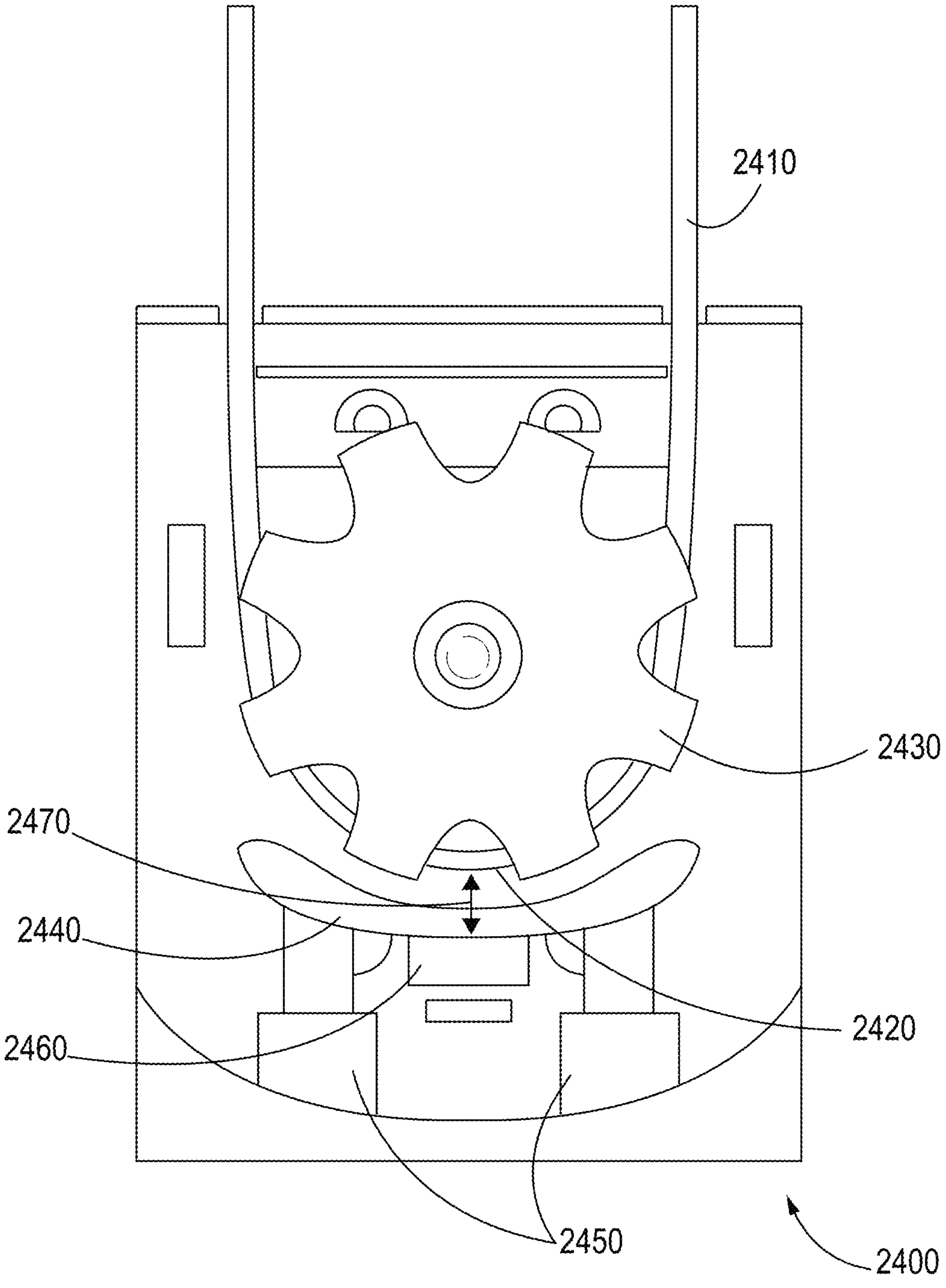
FIG. 24 is an elevational view of an upper portion of an external motor device as seen from the rear with cover removed, according to an embodiment.

FIG. 24 shows a pulley driven wheel drive assembly 2400 including a continuous cord loop sensor system to address the problem of creep in cord-type continuous cord loop drives. The pulley driven wheel drive assembly includes a pulley type driven wheel 2430 that engages continuous cord loop cord 2410. A curved guide rail 2440, supported by support legs 2450, is located in close proximity to the cord 2410 over a segment at the lower loop end of the cord. The cord 2410 carries one or more sensor target 2420 (also herein referred to as a target or marker) at an area of the cord’s surface that faces the guide rail. A continuous cord loop sensor 2460 (also herein referred to simply as sensor) is mounted to guide rail adjacent the lowermost portion of the continuous cord loop. In this example, the sensor 2460 is a proximity sensor that is separated from the target 2420 by a short distance 2470 within the operating range of the sensor. In other embodiments, the sensor may be a contact sensor that is mounted to the guide rail in contact with the cord 2410.

A sensor target or marker may be formed of any material suitable for marking a cord for proximity sensing or contact sensing by the sensor technology. For example, a marker may be formed of a metal, metallic alloy, other electrically conductive material, or a reflective or retroreflective material suitable for receiving an electromagnetic energy emitted by the sensor and reflecting that energy back to the sensor. The sensor target or marker can be a piece of tape, foil, coating, or printed pattern of material at a surface area of the continuous cord loop cord. The marker may have various shapes or patterns, such as rectangular, polygonal, and round, among other possibilities. The marker may be a durable material that is firmly adhered or applied to the surface of the continuous cord loop cord so as to remain intact on the cord surface during continuing operation, particularly in the case of contact sensing.

The marker, or each of multiple markers, is located at a portion of the cord that faces the sensor when the target is proximate to or in contact with the sensor during movement of the continuous cord loop cord. In one configuration, a marker is located at a single location on the cord that serves as a reference point along the length of the cord. The control system records the initial position of the reference point during system calibration. In another configuration, multiple markers are located at different initial positions. The controller is calibrated to store an initial position of each of the multiple markers along the continuous cord loop and is configured to receive the signal indicating presence of each sensor target and to identify a drift from the respective initial position during continuing operation of the drive system.

In an embodiment, sensor targets includes a first marker and a second marker located at two positions on the cord, e.g., a top reference point and a bottom reference point. The controller may be calibrated to store a first initial position of the first marker corresponding to a top position of the window covering and a second initial position of the second marker corresponding to a bottom position of the window covering. In an embodiment, the top and bottom reference points correspond to calibrated top and bottom limits to the range of motion of the window covering. The top reference point (initial position of the first marker) may correspond to the top position set at 808 and the bottom reference point (initial position of the second marker) may correspond to the bottom position set at 814 in the SET calibration routine of FIG. 8.

During subsequent movements of the continuous cord loop cord, when the target or one of multiple targets passes through the sensor assembly, the controller receives signals from the sensor indicating presence of the target. In an embodiment, the controller compares the target's current location with its calibration reference and generates an indication or other response in the event the controller identifies drift from the initial position. In an embodiment, the controller recalibrates the drive system to correct (adjust) window covering positioning signals for any drift detected. In the embodiment including first and second markers, the controller can recalibrate one or both of a calibrated top position and a calibrated bottom position and thereby adjust the range of motion of the window covering. Through this procedure, the controller can compensate for creep in the continuous cord loop cord.

The sensor may be a device mounted to the guiderail that is configured to output a signal indicating presence of a sensor target when a sensor target is located in proximity to or in contact with the sensor. The controller receives that signal and may generate an indication or other response to that signal. In various embodiments, the sensor is a proximity sensor, e.g., a sensor able to detect the presence of a nearby target without any physical contact and that emits an output signal when the target is located within an operating range of the sensor. In an embodiment, the proximity sensor emits an electromagnetic field or a beam of electromagnetic radiation such as infrared (IR), and looks for changes in the field or a return signal. In an embodiment, the sensor target or each of multiple sensor targets includes a piece of reflective material configured to reflect a beam of electromagnetic energy emitted by the sensor back to the sensor when the sensor target is located in proximity to the sensor. Proximity sensors can have a high reliability and long functional life because of the absence of mechanical parts and lack of physical contact between the sensor and the target.

In various embodiments, the sensor is a contact sensor, e.g., a sensor that senses the presence of a target via physical contact with the target and outputs a signal indicating presence of the sensor target in the event of such physical contact. In an embodiment, the contact sensor includes a plurality of contacts connected to an electrical circuit. The sensor target includes a piece of electrically conductive material that causes a short circuit in the electrical circuit when the electrically conductive material is in contact with the plurality of contacts.

Figure 25:
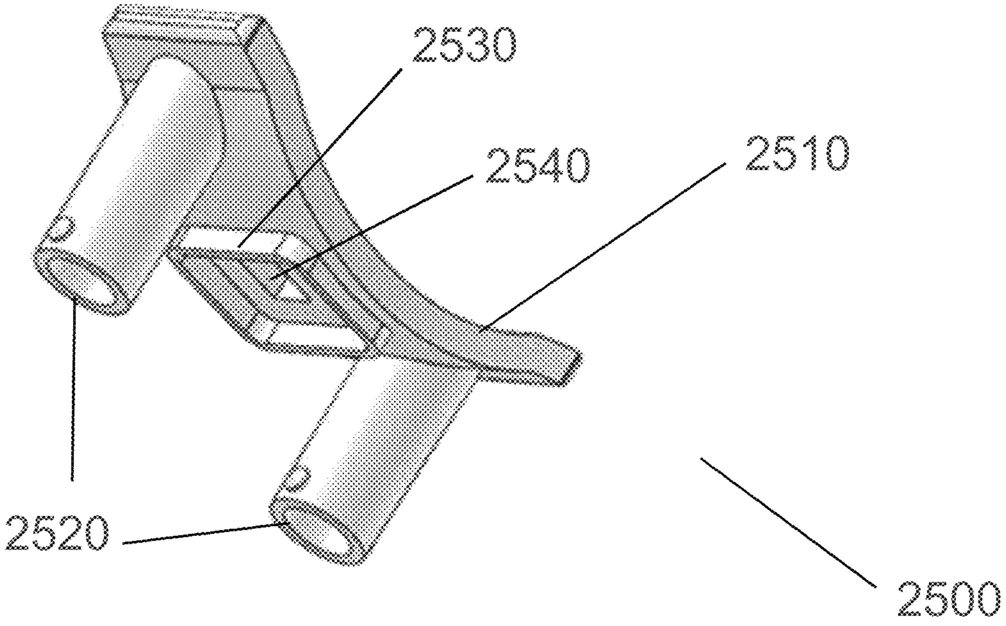
FIG. 25 is an isometric view of a curved guide rail with mounting surface for infrared sensor, according to an embodiment.
Figure 26:
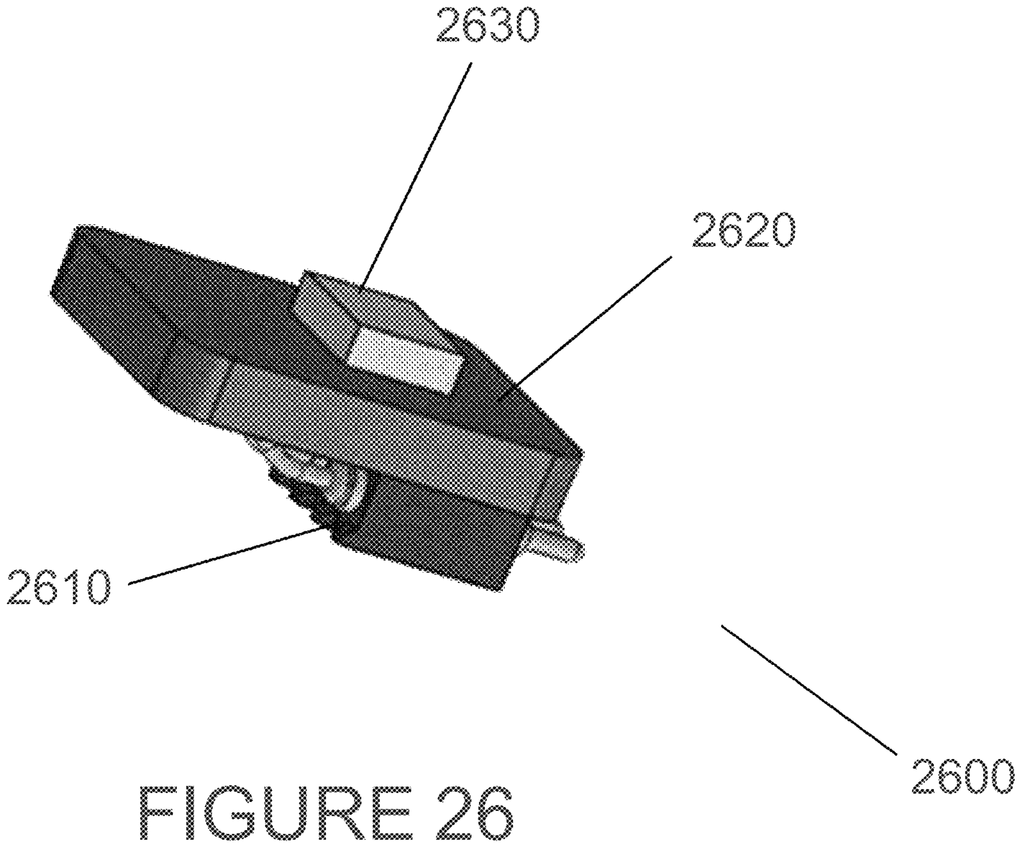
FIG. 26 is an isometric view of an infrared sensor on printed circuit board, according to an embodiment.

In various embodiments, an IR sensor is mounted onto or into the guide rail as a proximity sensor. The guide rail mount and IR sensor may have surface mount and through-hole mounting configurations. FIGS. 25 and 26 show a curved guide rail with mounting surface for IR sensor and an infrared sensor on PCB. In the guide rail mount 2500 of FIG. 25, a curved guide rail 2510 with support legs 2520 includes a sensor mount 2530. Sensor mount 2530 receives an IR sensor module 2600, such as the sensor 2610 on PCB 2620. Sensor 2600 has a through-hole mounting configuration in which a mounting portion 2630 is seated in an opening 2540 in the PCB.

In an example, IR sensor module 2610 includes side-by-side IR emitter and IR sensor. A 940 nm emitter (LED) is encased side by side facing in the same direction with a compatible silicon phototransistor. In another example, the IR sensor is a phototransistor output, reflective photointerrupter with an optimal optical sensing distance of 0.5 mm. In a further example, the IR sensor is an ultra-compact SMD type reflective microsensor with a detectable sensing distance 1.0 mm. The sensor working distance matches well with constraints imposed by mechanical layout of the external motor drive.

In an example, a target was a strip of metal tape on the cord. When the target was present within the sensor's operating range, the output of the sensor dropped to ground as it reflected off the strip of metal tape. This signal was used as hard reference point to correct for any drift in window cover positioning control. A disadvantage of IR sensors was an increased computational load on the microcomputer 310 to sample and effectively analyze the analog output signal. In testing, signal quality varied dramatically with physical configuration of the cord and marker as these characteristics affected effective distance of the target from the sensor. Signal quality may improve by perforating the metal tape before adhering the tape to the cord.

Figure 27:
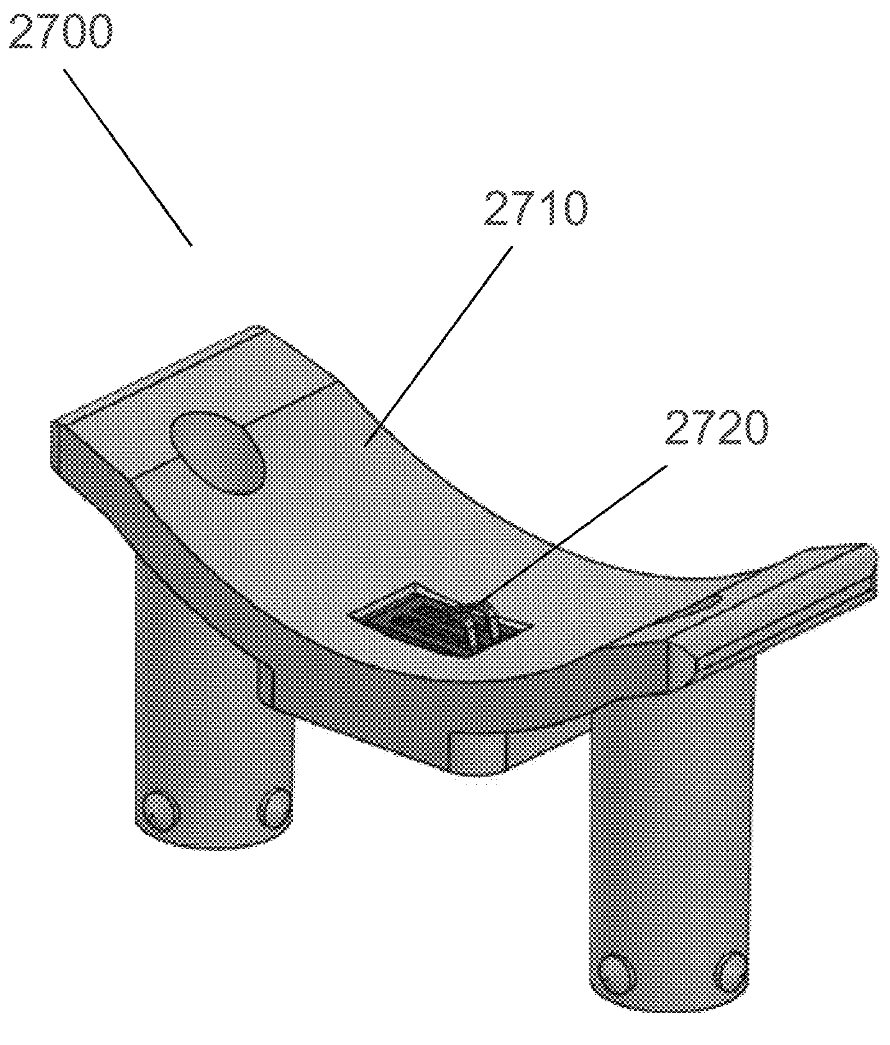
FIG. 27 is an isometric view of a curved guide rail with leaf spring contacts sensor, according to an embodiment.

FIG. 27 shows an embodiment of continuous cord loop sensor system 2700 with a contact sensor, including a curved guide rail 2710 with leaf spring contacts 2720 that protrude above the guide rail in the absence of contact with a continuous cord loop. One objective of leaf spring sensor 2700 was to alleviate concerns of signal quality by using a well-established principle of contact sensors. The sensor 2700 has an electrical circuit including two or more contacts, in this case leaf spring contacts 2720. Physical contact of leaf spring contacts 2720 with a passing metal tape or other electrically conductive marker creates an alternative circuit path with very low electrical impedance, e.g., a short circuit. The resulting signal is a short circuit between the two leaf springs contacts, which is detectable by the microcomputer 310 providing a robust sensor that requires only modest computational load. The leaf springs' working height allowed the springs to extend into the pulley to accommodate variations in cord thickness. However, leaf spring contacts could be fragile, showing a tendency to deform during installation or use.

Figure 28:
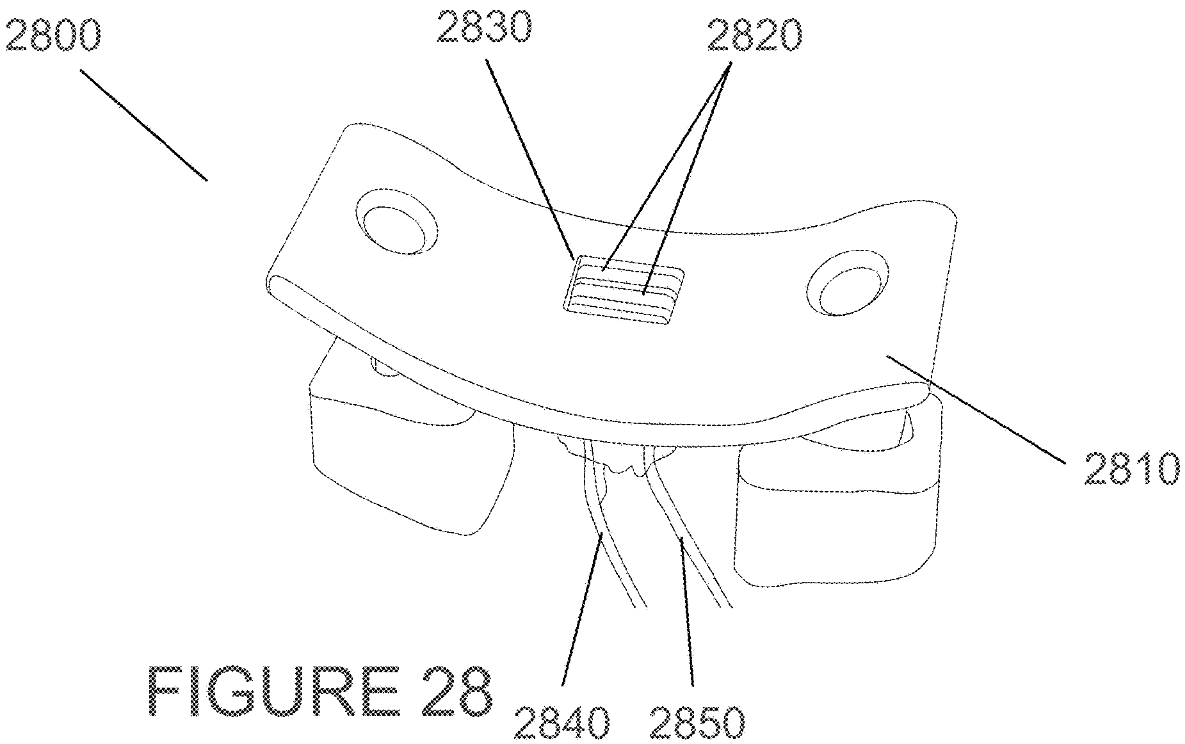
FIG. 28 is a perspective view of a curved guide rail with flat contacts sensor, according to an embodiment.

FIG. 28 shows an embodiment of continuous cord loop sensor system 2800 with a contact sensor, including flat contacts 2820, 2830 with electrical leads 2840, 2850 on a curved guide rail 2810. Given that the contacts have no compliance in their working height, a pulley wheel was redesigned from a traditional V-groove design. The redesigned pulley wheel had a flatter profile to allow the cord to clear the pulley's sides and touch the flat contacts consistently.

Figure 29:
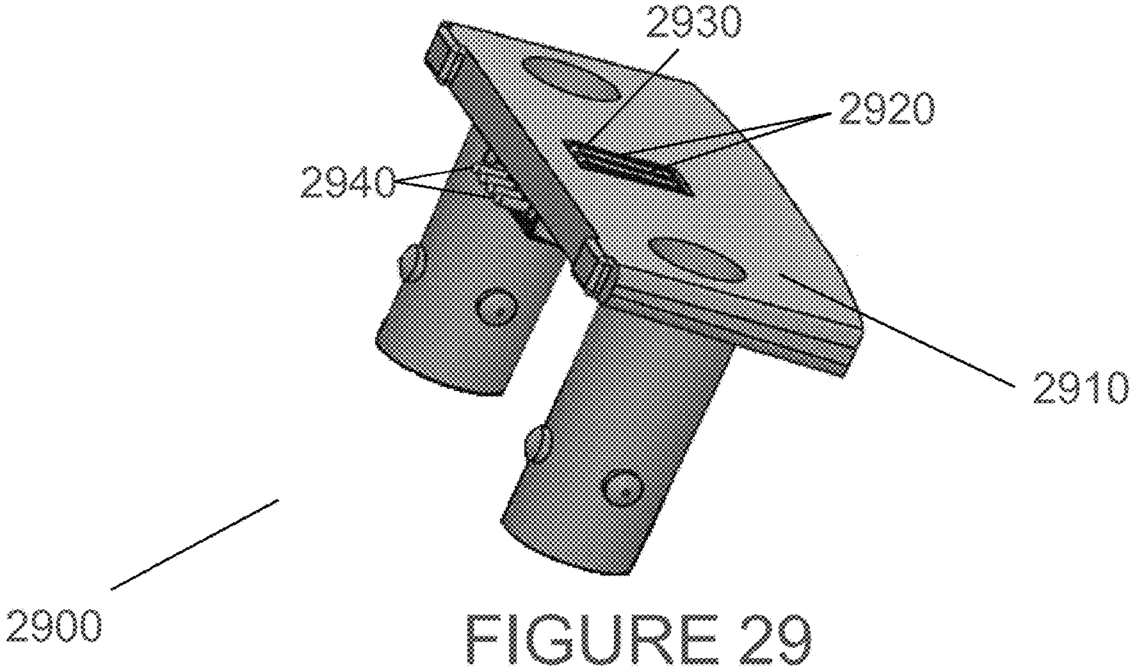
FIG. 29 is an isometric view of a flat guide rail with flat contacts sensor, according to an embodiment.

FIG. 29 shows an embodiment of continuous cord loop sensor system 2900 with a contact sensor, including flat contacts 2920 on a flat guide rail 2910. Flat contacts 2920 extend from electrical printed circuit board (PCB) 2940 through recess 2930. This design addressed a problem of the flat contacts design 2800, that bend radius of the curved guide rail 2810 could prevent the metal tape marker from achieving full contact with the flat contacts. In performance tests, the flat guide rail greatly improved reliability of a flat contacts design. Testing included two configurations for the flat contacts sensor: (a) a horizontal configuration in which the flat contacts are collinear with the continuous cord loop cord, and (b) a vertical configuration in which the flat contacts are perpendicular to the continuous cord loop cord. There are two problems with both configurations. After extended use, the closeness of connectors 2920 to the edge of recess 2930 can cause the metal tape to be caught on the contacts and pry the contacts off the PCB. If the metal tape is relatively smooth (e.g., for a new tape), the flat guide rail may not exert enough force in pushing the flat contacts onto the metal tape, resulting in a false negative misfire.

Figure 30:
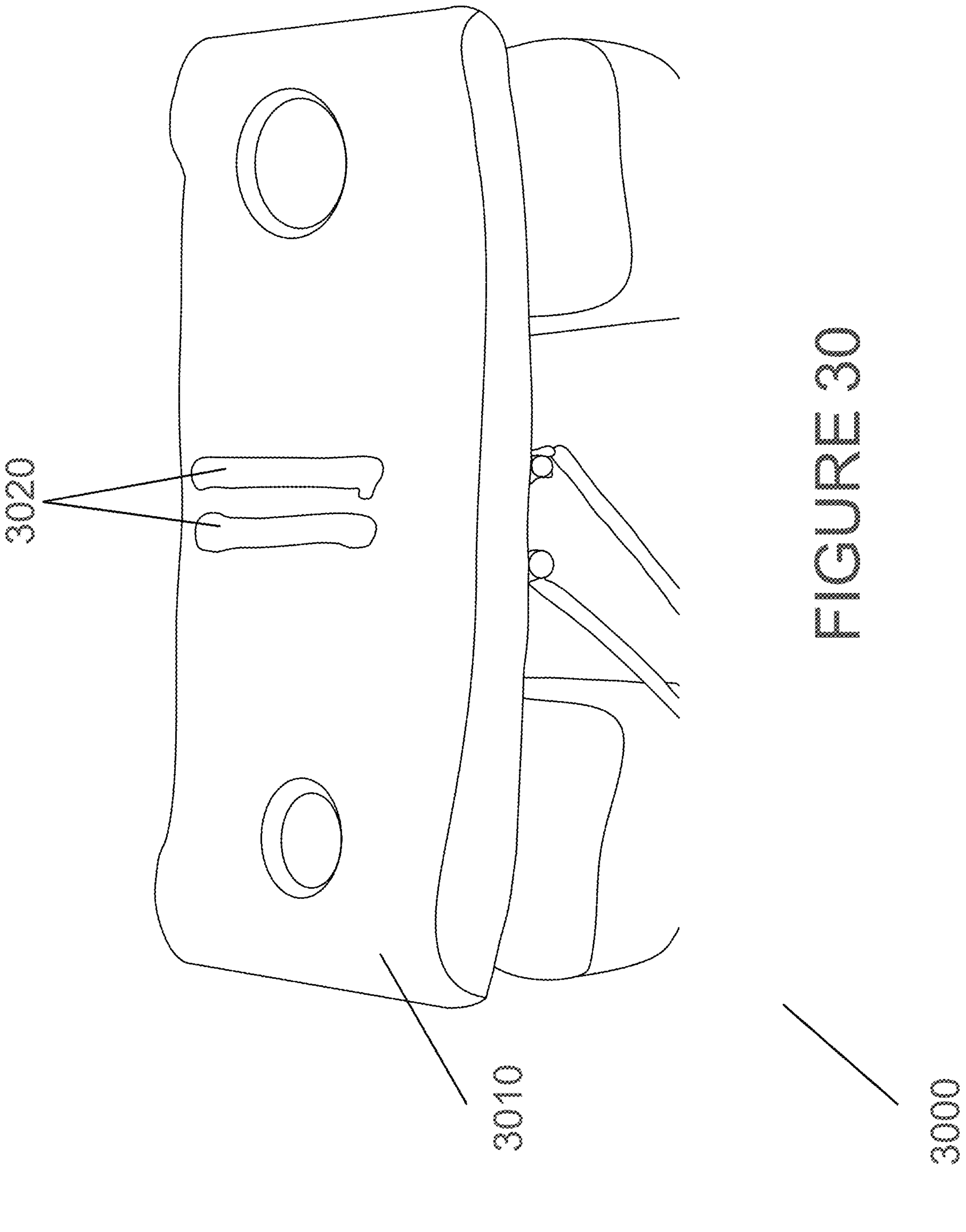
FIG. 30 is a perspective view of a flat guide rail with wire contacts sensor, according to an embodiment.

FIG. 30 shows an embodiment of continuous cord loop sensor system 3000 with a contact sensor, including a flat guide rail 3010 with wire contacts 3020 that protrude above the guide rail. In the design, the sensor PCB is hidden under the guide rail, thereby solving the problem in the sensor system 2900 of metal tape becoming caught on the contacts and prying the connector off the PCB. In addition, the higher profile of the wire contacts 3020 ensured that the contacts protrude into the pulley and make robust contact with the metal tape marker.

Applicants tested three configurations of the fourth contact sensor embodiment 3000: (a) 1 mm diameter wire in horizontal configuration, collinear with the continuous cord loop cord; (b) 1 mm diameter wire in vertical configuration, perpendicular to the continuous cord loop cord; and (c) 0.5 mm diameter wire in horizontal configuration, collinear with the continuous cord loop cord. In performance tests, wire contacts 3020 created a good contact with metal tape marker(s). A smooth rounded configuration of the 90° curves of wire contacts 3020 was observed to prevent the metal tape from getting caught by the contacts. The horizontal configurations performed better than the vertical configuration. 1 mm diameter horizontal wire contacts performed better than the 0.5 mm diameter horizontal wire contacts in that the larger diameter contacts created a stronger contact with the metal tape.

While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be rearranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code, being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc ("CD"), laser disc, optical disc, digital versatile disc ("DVD"), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

What is claimed is:

1. A drive system for use with a window covering system, the window covering system including a mechanism for raising and lowering a window covering and a continuous cord loop extending below the mechanism; the drive system comprising:

a motor configured to operate under electrical power to rotate an output shaft of the motor;

a driven wheel coupled to the output shaft of the motor and configured to engage the continuous cord loop, wherein rotation of the driven wheel in a first direction is configured to cause the continuous cord loop to cause the mechanism to raise the window covering and rotation of the driven wheel in a second direction is configured to advance the continuous cord loop to cause the mechanism to lower the window covering;

one or more sensor targets configured to be disposed on the continuous cord loop;

a controller for the motor; and a sensor operatively connected to the controller and configured to generate a signal indicating presence of each of the one or more sensor targets when the sensor target is located in proximity to or in contact with the sensor.

2. The drive system of claim 1, wherein the sensor is a proximity sensor, wherein each of the one or more sensor targets comprises a piece of reflective material configured to reflect a beam of electromagnetic energy emitted by the sensor back to the sensor when the target is located in proximity to the sensor.

3. The drive system of claim 2, wherein the proximity sensor comprises an infrared sensor.

4. The motor drive system of claim 1, wherein the sensor is a contact sensor comprising a plurality of contacts connected to an electrical circuit, wherein each of the one or more sensor targets comprises a piece of electrically conductive material configured to cause a short circuit in the electrical circuit when the piece of electrically conductive material is in contact with the plurality of contacts.

5. The drive system of claim 4, wherein the contact sensor comprises a plurality of leaf spring contacts.

6. The drive system of claim 4, wherein the contact sensor comprises a plurality of flat contacts embedded in a recess of a guide rail.

7. The drive system of claim 4, wherein the contact sensor comprises a plurality of wire contacts, wherein the wire contacts project above a guide rail.

8. The drive system of claim 1, wherein each of the one or more sensor targets is a piece of metal tape or a piece of reflective tape configured to adhere to the continuous cord loop.

9. The drive system of claim 1, wherein the sensor comprises a guide rail having (i) a curved surface adjacent the driven wheel, or (ii) a substantially flat surface adjacent the driven wheel.

10. The drive system of claim 1, wherein the controller is calibrated to store a position of each of the one or more sensor targets along the continuous cord loop and is configured to receive the signal indicating presence of each of the one or more sensor targets and to identify a drift from the respective position during continuing operation of the drive system.

11. The drive system of claim 1, wherein the one or more sensor targets comprise a first marker and a second marker, wherein the controller is calibrated to store a first position of the first marker configured to correspond to a top position of the window covering and a second position of the second marker configured to correspond to a bottom position of the window covering, wherein the controller is configured to receive the signal indicating presence of each of the first marker and second marker and to identify a drift from the respective position during continuing operation of the drive system.

12. The drive system of claim 11, wherein the controller is configured to recalibrate the first position and the second position upon identifying the drift.

13. A drive system for use with a window covering system, the window covering system including a roller blind mechanism for raising and lowering a window covering fabric and a continuous cord loop extending below the mechanism; the drive system comprising:

a motor configured to operate under electrical power to rotate an output shaft of the motor;

a driven wheel coupled to the output shaft of the motor and configured to engage the continuous cord loop;

one or more sensor targets configured to be disposed on the continuous cord loop;

a controller for the motor; and a sensor operatively connected to the controller and is configured to generate a signal indicating presence of each of the one or more sensor targets when the sensor target is located in proximity to or in contact with the sensor, wherein the controller is calibrated to store a position of each of the one or more sensor targets and is configured to receive the signal indicating presence of each of the one or more sensor targets and to identify a drift from the respective position during continuing operation of the drive system.

14. The drive system of claim 13, wherein the one or more sensor targets comprise a first marker and a second marker, wherein the controller is calibrated to store a first position of the first marker configured to correspond to a top position of the window covering fabric and a second position of the second marker configured to correspond to a bottom position of the window covering fabric, wherein the controller is configured to receive the signal indicating presence of each of the first marker and second marker and to identify a drift from the respective first position or second position during continuing operation of the drive system.

15. The drive system of claim 14, wherein the controller is configured, in the event of identifying the drift from the respective first position or second position during continuing operation of the drive system, to recalibrate the respective first position or second position to compensate for the identified drift.

16. The drive system of claim 13, wherein rotation of the driven wheel in a first direction is configured to advance the continuous cord loop to cause the roller blind mechanism to raise the window covering and rotation of the driven wheel in a second direction is configured to advance the continuous cord loop to cause the roller blind mechanism to lower the window covering fabric.

17. The drive system of claim 13, wherein the controller is configured to recalibrate upon identifying the drift.

18. The drive system of claim 13, wherein the sensor is a proximity sensor, wherein each of the one or more sensor targets comprises a piece of reflective material configured to reflect a beam of electromagnetic energy emitted by the sensor back to the sensor when the target is located in proximity to the sensor.

19. The drive system of claim 18, wherein the proximity sensor comprises an infrared sensor.

20. The drive system of claim 13, wherein the sensor is a contact sensor comprising a plurality of contacts connected to an electrical circuit, wherein each of the one or more sensor targets comprises a piece of electrically conductive material configured to cause a short circuit in the electrical circuit when the piece of electrically conductive material is in contact with the plurality of contacts.

* * * * *